(12) United States Patent
Jang et al.

(10) Patent No.: US 12,028,245 B2
(45) Date of Patent: Jul. 2, 2024

(54) ELECTRONIC DEVICE FORMING NETWORK SLICE AND DATA SESSION, AND METHOD FOR OPERATING SAME

(71) Applicant: SAMSUNG ELECTRONICS CO., LTD., Suwon-si (KR)

(72) Inventors: Jaewon Jang, Suwon-si (KR); Sungin Kim, Suwon-si (KR); Hongshik Kim, Suwon-si (KR); Ansik Shin, Suwon-si (KR); Yujin Jeong, Suwon-si (KR); Taewan Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/981,941

(22) Filed: Nov. 7, 2022

(65) Prior Publication Data

US 2023/0109249 A1    Apr. 6, 2023

Related U.S. Application Data

(63) Continuation of application No. PCT/KR2021/004064, filed on Apr. 1, 2021.

(30) Foreign Application Priority Data

May 7, 2020    (KR) .................. 10-2020-0054804
May 29, 2020   (KR) .................. 10-2020-0065384
Jul. 27, 2020   (KR) .................. 10-2020-0093411

(51) Int. Cl.
*H04L 45/302*    (2022.01)
*H04L 67/141*    (2022.01)

(52) U.S. Cl.
CPC .......... *H04L 45/306* (2013.01); *H04L 67/141* (2013.01)

(58) Field of Classification Search
CPC ........................ H04L 45/306; H04L 67/141
(Continued)

(56) References Cited

U.S. PATENT DOCUMENTS 10,397,892 B2   8/2019   Vrzic et al.
10,582,565 B2   3/2020   Yang et al.
(Continued)

FOREIGN PATENT DOCUMENTS

CN    110495214 A    11/2019
CN    110663284 A     4/2020
(Continued)

OTHER PUBLICATIONS

International Search Report for PCT/KR2021/004064, dated Jul. 16, 2021, 5 pages.
(Continued)

*Primary Examiner* — Ruolei Zong
(74) *Attorney, Agent, or Firm* — NIXON & VANDERHYE P.C.

(57) ABSTRACT

According to various embodiments, an electronic device includes at least one processor. The at least one processor may be configured to: confirm a data session establishment request from a first application executed by the at least one processor; confirm at least one first descriptor corresponding to the first application for path selection; confirm a first network interface corresponding to the at least one first confirmed descriptor based on the at least one first confirmed descriptor; establish a first data session corresponding to the at least one first confirmed descriptor; and transmit and/or receive data related to the first application through the first network interface using the first data session.

17 Claims, 34 Drawing Sheets

(58) Field of Classification Search
USPC .......................................................... 709/238
See application file for complete search history.

(56) References Cited

U.S. PATENT DOCUMENTS

| | | | |
|---|---|---|---|
| 10,602,422 B1 | 3/2020 | Jagannatha et al. | |
| 10,652,942 B2 | 5/2020 | Castellanos Zamora et al. | |
| 2012/0106570 A1 | 5/2012 | Li | |
| 2017/0141973 A1 | 5/2017 | Vrzic | |
| 2017/0189812 A1* | 7/2017 | Ozer | A63F 13/48 |
| 2017/0245316 A1 | 8/2017 | Salkintzis | |
| 2018/0288654 A1 | 10/2018 | Shih et al. | |
| 2018/0376444 A1 | 12/2018 | Kim et al. | |
| 2019/0021047 A1 | 1/2019 | Zong | |
| 2019/0124561 A1 | 4/2019 | Faccin et al. | |
| 2019/0182737 A1 | 6/2019 | Futaki et al. | |
| 2019/0182875 A1 | 6/2019 | Fard et al. | |
| 2019/0356743 A1* | 11/2019 | Park | H04W 76/15 |
| 2019/0357136 A1* | 11/2019 | Li | H04W 48/18 |
| 2020/0053622 A1 | 2/2020 | Huang-fu et al. | |
| 2020/0053806 A1* | 2/2020 | Han | H04W 76/15 |
| 2020/0163010 A1 | 5/2020 | Qiao et al. | |
| 2020/0178196 A1 | 6/2020 | Wang et al. | |
| 2020/0187085 A1* | 6/2020 | Jagannatha | H04L 41/0893 |
| 2020/0260330 A1 | 8/2020 | Zhu et al. | |
| 2021/0092657 A1* | 3/2021 | Kanagarathinam | H04W 76/19 |
| 2021/0259028 A1* | 8/2021 | Zhang | H04W 48/18 |
| 2022/0369401 A1* | 11/2022 | Won | H04W 72/53 |

FOREIGN PATENT DOCUMENTS

| | | |
|---|---|---|
| CN | 111034336 A | 4/2020 |
| EP | 3 477 993 A1 | 5/2019 |
| JP | 2022-050702 | 3/2022 |
| KR | 10-2012-0046187 | 5/2012 |
| KR | 10-2018-0116274 | 10/2018 |
| KR | 10-2019-0094242 | 8/2019 |
| KR | 10-2019-0139899 | 12/2019 |
| KR | 10-2020-0017297 | 2/2020 |
| WO | 2017/200978 | 11/2017 |

OTHER PUBLICATIONS

Written Opinion of the ISA for PCT/KR2021/004064, dated Jul. 16, 2021, 5 pages.
Extended European Search Report dated Aug. 10, 2023 for EP Application No. 21800368.9.
Chinese Office Action dated Apr. 18, 2024 for CN Application No. 202180047484.3.

* cited by examiner

ELECTRONIC DEVICE FORMING NETWORK SLICE AND DATA SESSION, AND METHOD FOR OPERATING SAME

CROSS-REFERENCE TO RELATED APPLICATIONS

This application is a continuation of International Application No. PCT/KR2021/004064 designating the United States, filed on Apr. 1, 2021, in the Korean Intellectual Property Receiving Office and claiming priority to Korean Patent Application No. 10-2020-0054804, filed on May 7, 2020, in the Korean Intellectual Property Office, to Korean Patent Application No. 10-2020-0065384, filed on May 29, 2020, in the Korean Intellectual Property Office, and to Korean Patent Application No. 10-2020-0093411, filed on Jul. 27, 2020, in the Korean Intellectual Property Office, the disclosures of all of which are incorporated by reference herein in their entireties.

BACKGROUND

Field

The disclosure relates to an electronic device for generating a network slice and a data session an operation method thereof.

Description of Related Art

To meet the demand for wireless data traffic having increased since deployment of 4G communication systems, efforts have been made to develop an improved 5G or pre-5G communication system. Therefore, the 5G or pre-5G communication system is also called a "beyond 4G network" communication system or a "post LTE" system. The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems.

Among new structural features of a 5G network is introduction of network slicing technology for a structure including a radio access network (RAN) and a core network (CN). This technology provides network resources and network functions grouped as one independent network slice according to individual services so as to apply attributes, such as isolation of network system functions and resources, customization, and independent management and orchestration, to a mobile communication network structure. Through such a network slicing technology, independent and flexible provision of a 5G service is possible through selection and combination of network functions of a 5G system according to a criterion of a service, a user, or a business model, etc.

In Release 15 of the 3rd generation partnership project (3GPP), a UE route selection policy (URSP) is defined. A user equipment (UE) may receive a URSP from a policy control function (PCF) and generate a network slice and a data session.

Applications executed in a user equipment may have different usage purposes. For example, an application may require transmission or reception of large amount of data, and another application may demand low latency transmission or reception of data. Accordingly, for each application, a data session needs to be connected to a network slice suitable for the usage purpose thereof. However, for each application, a specific implementation method of connecting a data session to a suitable network slice has not been discussed.

SUMMARY

Embodiments of the disclosure provide a network interface that may be assigned to each descriptor corresponding to applications, and transmission may be performed via the assigned network interface using a data session generated to correspond to the descriptor.

According to various example embodiments, an electronic device may include: at least one processor, wherein the at least one processor is configured to: identify a data session establishment request from a first application executed by the at least one processor, identify at least one first descriptor for route selection corresponding to the first application, identify a first network interface corresponding to the identified at least one first descriptor based on the identified at least one first descriptor, establish a first data session corresponding to the identified at least one first descriptor, and transmit and/or receive traffic associated with the first application via the first network interface using the first data session.

According to various example embodiments, an electronic device may include: at least one application processor, and at least one communication processor, wherein the at least one application processor is configured to: acquire first transmission data from a first application executed by the at least one application processor, and provide information associated with the first application and the first transmission data to the at least one communication processor, and the at least one communication processor is configured to: identify at least one first descriptor for route selection, corresponding to the first application, based on the information associated with the first application, and transmit the first transmission data using a first data session corresponding to the first descriptor.

According to various example embodiments, a method of operating a communication processor may include: receiving association information between one or more network interfaces and corresponding descriptors from an application processor operatively connected to the communication processor, establishing, based on reception of at least one first descriptor corresponding to a first network interface among the one or more network interfaces from the application processor, a first data session corresponding to the at least one first descriptor, based on the association information, and based on reception of a first IP packet via the first network interface, transmitting the received first IP packet using the first data session.

Various example embodiments may provide an electronic device and an operation method thereof, wherein a network interface is assigned to each descriptor corresponding to applications, and transmission is performed via the assigned network interface using a data session established to correspond to the descriptor. Accordingly, traffic for each application may be transmitted via a network slice suitable for the usage purpose of the application.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
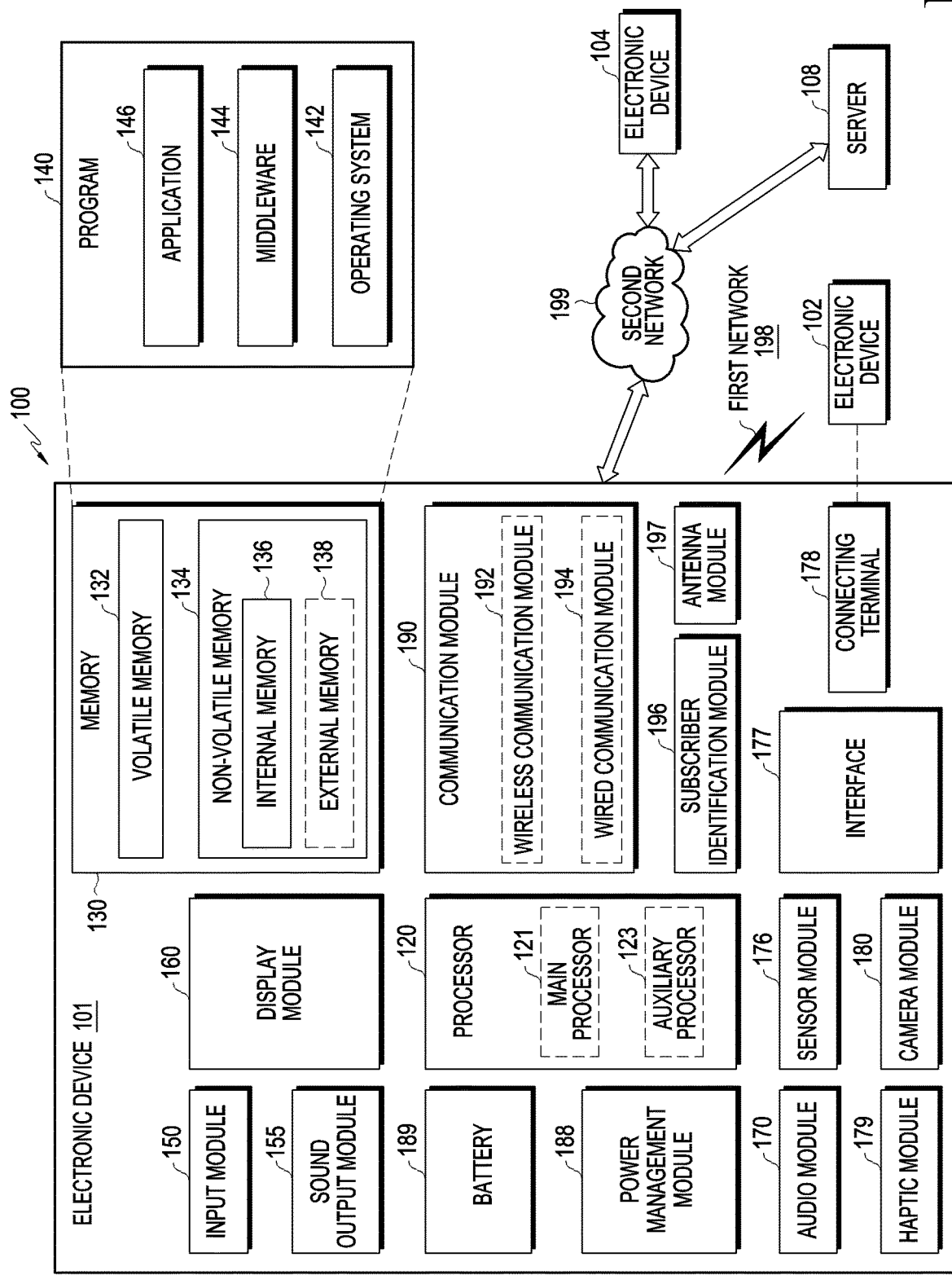
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146. The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images.

According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

In the following description, terms for identifying access nodes, terms referring to network entities, terms referring to messages, terms referring to interfaces between network entities, terms referring to various identification information, and the like are illustratively used for the sake of convenience. In the following description, various embodiments of the disclosure will be described using terms and names defined in 5G system standards for the convenience of description. However, the disclosure is not limited by these terms and names, and may be applied in the same way to systems that conform other standards. The following detailed description of embodiments of the disclosure will be mainly directed to the communication standards defined by 3GPP. However, based on determinations by those skilled in the art, the main idea of the disclosure may also be applied to other communication systems having similar technical backgrounds through some modifications without significantly departing from the scope of the disclosure.

A general communication system is designed independently of an application provided on the communication system. A user accesses the communication system first, and then selects an application to use and receives a service. A communication technology has developed in a way of configuring a network slice optimized for an application characteristic of each application in one enormous network with development of a technology, such as network function virtualization (NFV), or software defined networking (SDN).

One network slice may be configured by an end-to-end (E2E) logical network including a counterpart node (a counterpart electronic device or a counterpart application server) from the electronic device 101.

A user may access a network slice specialized for an application used thereby, and receive a service. For example, a terminal of a user may simultaneously access one or more network slices.

3GPP serving as a standard of mobile communication technology has completed the 5G Phase I standard in Rel-15, and 5G Phase I includes a network slicing function. In Rel-16, a network slicing Phase II standard is proceeding.

Figure 2A:
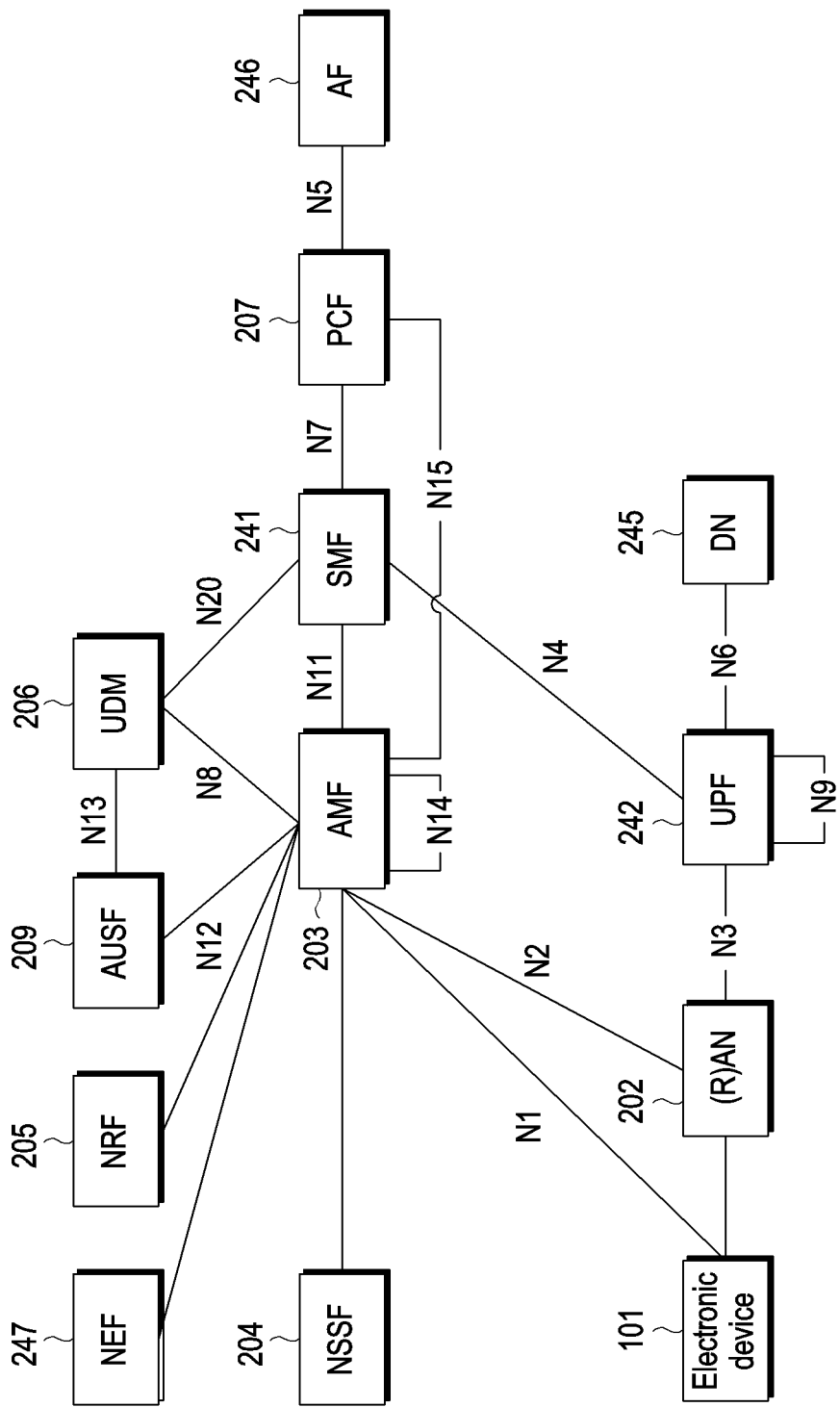
FIG. 2A is a diagram illustrating an example 5G system structure according to various embodiments.
Figure 2B:
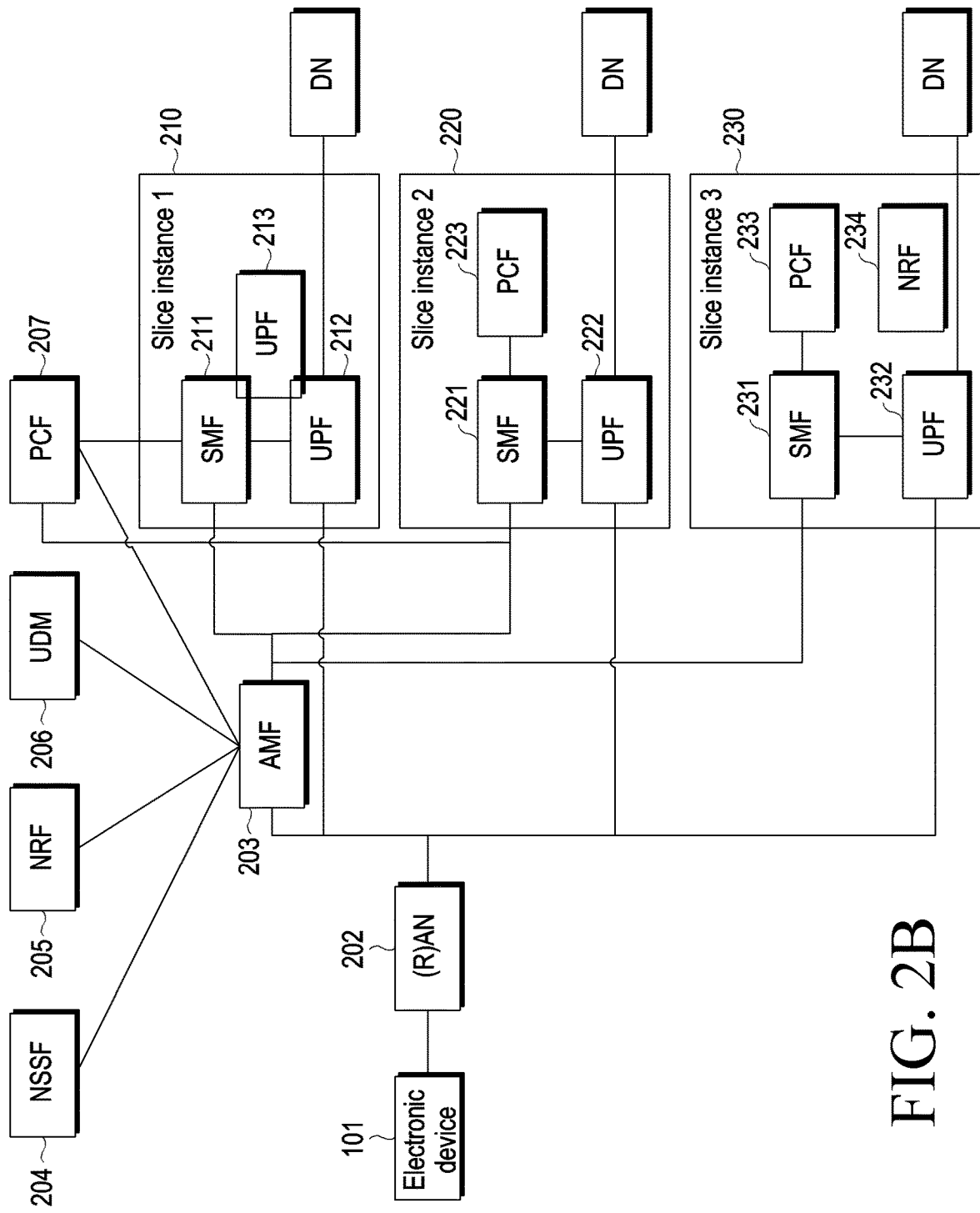
FIG. 2B is a diagram illustrating an example 5G network slice structure according to various embodiments.

FIG. 2A is a diagram illustrating an example 5G system structure according to various embodiments. FIG. 2B is a diagram illustrating an example 5G network slice structure according to various embodiments. Hereinafter, with reference to FIG. 2A and FIG. 2B, an overall 5G system will be described, and a description for a network slice will be given.

As illustrated in FIG. 2A, a 5G system structure may include the electronic device 101 (e.g., a user terminal (UE)) that is a network element, a (radio) access network 202 ((R)AN), a data network (DN) 245, and multiple network functions (NFs) in a core network (CN).

In the 5G system structure, a function, a connection point, a protocol, etc. may be defined for each of the multiple NFs, and the 5G system structure may be illustrated using a reference point indicating an interface based on a service corresponding to the NF, and a reference point indicating interaction existing between the NFs.

The multiple network functions (NFs) may include an authentication server function (AUSF) 209, an access and mobility management function (AMF) 203, a network exposure function (NEF) 247, a network function repository function (NRF) 205, a policy control function (PCF) 207, a session management function (SMF) 241, a unified data management (UDM) 206, a user plane function (UPF) 242, an application function (AF) 246, and a network slice selection function (NSSF) 204.

In various embodiments of the disclosure, the AMF, the SMF, the PCF, and the UPF may play as a key role in establishment of a protocol data unit (PDU) ("UE-requested PDU") session requested by the user equipment, and traffic management between the UE and the DN.

The reference point between the electronic device 101 and the AMF 203 is defined as N1.

The (R)AN 202 may indicate a base station using a radio access technology (RAT). For example, the AN 202 may be a base station including a 3GPP access technology or a base station including a non-3GPP access technology, such as Wi-Fi. The reference point between the AN 202 and the AMF 203 is defined as N2, the reference point between the AN and the UPF 242 is defined as N3, and the reference point between the UPFs 242 is defined as N9.

The DN 245 may transfer, to the UPF 242, a PDU to be transmitted in the downlink direction, or may receive, via the UPF 242, a PDU transmitted by the electronic device 101. The reference point between the DN 245 and the UPF 242 is defined as N6.

The AMF 203 may be independent of access technology, and, for example, provide an access and mobility management function in the unit of the electronic device 101. The reference point between the AMF 203 and the electronic device 101 is defined as N1, the reference point between the AMF 203 and the (R)AN 202 is defined as N2, the reference point between the AMF 203 and the UDM 206 is defined as N8, the reference point between the AMF 203 and the AUSF 209 is defined as N12, the reference point between the AMF 203 and the SMF 241 is defined as N11, the reference point between the AMFs 203 is defined as N14, and the reference point between the AMF 203 and PCF 207 is defined as N15.

The SMF 241 may provide a session management function of, where one electronic device 101 has several sessions, assigning a different SMF to each session to manage each session. The reference point N4 is defined to allow the UPF 242 to be configured using control signal information generated in the SMF 241, and allow the UPF 242 to report its own state to the SMF 241. The reference point between the SMF 241 and the AMF 203 is defined as N11, the reference point between the SMF 241 and the UDM 206 is defined as N10, the reference point between the SMF 241 and the PCF 207 is defined as N7, the reference point between the SMF 241 and the AMF 203 is defined as N11, and the reference point between the SMF 241 and UDM 206 is defined as N20.

For example, while each electronic device 101 may be connected to one AMF 203, in a case of the SMF 241, one electronic device 101 may establish several sessions, and thus have different SMFs 211, 211, and 231 for the respective sessions.

The AF 246 may provide information about packet flow to the PCF 207 serving as policy control in order to ensure quality of service (QoS).

The PCF 207 may determine a policy of session management, mobility management, etc., based on information about packet flow for ensuring QoS, and transfer same to the AMF 203 and the SMF 241 to perform proper mobility management, session management, QoS management, etc. The reference point between the AF 246 and the PCF 207 is defined as N5.

The AUSF 209 may store data for authentication of the electronic device 101.

The UDM 206 may store a user's subscription data, policy data, etc. The reference point between the AUSF 209 and the UDM 206 is defined as N13, the reference point between the AUSF 209 and the AMF 203 is defined as N12, the reference point between the UDM 206 and the AMF 203 is defined as N8, and the reference point between the UDM 206 and the SMF 241 is defined as N10.

CP functions includes various functions for controlling a network and a terminal. The electronic device 101, the (R)AN 202, the UPF 242, the AMF 203, the AF 246, and the DN 245 performing a mobility management function and the SMF 241 performing a session management function, the functions being the two representative functions, correspond to two independent functions, and may be included in the CP functions.

A slice, a service, a network slice, a network service, an application slice, and an application service may be used together to describe the embodiments of the disclosure.

A mobile communication service provider may assign a network resource suitable to a corresponding service for each slice or each particular set of slices. The network resource may indicate a network function (NF) or assignment of a logical resource or a radio resource provided by the network function (NF).

Network slicing is a technology of providing network resources and network functions grouped into one independent slice according to service so as to apply attributes, such as network isolation, customization, and independent management and orchestration, to a mobile communication core network structure.

Network slicing is a new concept of a 5G core network. The network slicing is a technology of grouping network resources and network functions required for a service requested by a mobile terminal into one independent slice, and providing same.

Through network slicing, a network service provider may independently assign a network resource specialized for each service and user, and ensure network flexibility through resource virtualization based on a technology of network function virtualization (NFV) and software defined networking (SDN) so as to ensure expandability and reliability of operation of network resource and service.

A public land mobile network (PLMN) may provide several network slices, and each network slice may be provided to a terminal in the type of slice instances. For example, the PLMN may include slice instance 1 210, slice instance 2 220, and slice instance 3 230.

The electronic device 101 may access a network and simultaneously or sequentially receive a service from at least one of several slices.

Each slice instance may be configured by network resources required for providing a corresponding network slice. For example, slice instance 1 210 may be configured by the SMF 211 and UPFs 212 and 213, slice instance 2 220 may be configured by the SMF 221, an UPF 222, and a PCF 223, and slice instance 3 230 may be configured by the SMF 231, a UPF 232, a PCF 233, and an NRF 234.

Referring to FIG. 2A and FIG. 2B, the SMF 221 of slice instance 2 220 may be connected to the PCF 207 in a PLMN level and the PCF 223 in a slice level. The PCF 207 in the PLMN level may manage policy information in the PLMN level and provide same to the SMF 221. The PCF 223 in the slice level belonging to slice instance 2 may manage a policy required for providing a corresponding slice, and provide corresponding information to the SMF 221.

Each slice may be distinguished by a slice ID. For example, a slice ID may be single-network slice selection assistance information (S-NSSAI) defined in 3GPP. According to various embodiments, the electronic device 101 may store configured network slice selection assistance information (Configured NSSAI) and information relating to a network slice selection policy (NSSP). The configured network slice selection assistance information (Configured NSSAI) may be configured by a list of S-NSSAIs of network slices for which the electronic device 101 has subscribed a home PLMN (HPLMN). A list of S-NSSAIs may include at least one S-NSSAI #id. For example, the list of S-NSSAIs may include S-NASS AI #a, S-NASSAI #b, S-NASS AI #c, and S-NASSAI #d. Configured NSSAI is determined based on subscription information of the electronic device 101, and thus S-NSSAIs configuring the configured NSSAI may be different for each electronic device 101. In addition, configured NSSAI is determined based on subscription information of the electronic device 101, and thus when the subscription information of the electronic device 101 is changed, the configured NSSAI stored in the electronic device 101 may also be changed. A list of S-NSSAIs which are subscribed by the electronic device 101 and configures configured NSSAI may be stored in the integrated UDM 206 for storing subscription information of the electronic device 101. S-NSSAI stored in the UDM 206 and subscribed by the electronic device 101 may be called "subscribed S-NSSAI". A network slice selection policy (NSSP) may indicate mapping information between S-NSSAI (S-NSSAI #id) subscribed by the electronic device 101 and an application supportable by the S-NSSAI. One S-NSSAI #id may be mapped to at least one application. For example, S-NASSAI #a may be mapped to App #1 and App #2, S-NASSAI #b may be mapped to App #1, S-NASSAI #c may be mapped to App #3, and S-NASSAI #may be mapped to all supportable applications. An NSSP may be stored in the electronic device 101 and a policy control function (PCF) for storing network-related policy information. Alternatively, an NSSP may be stored in a user data repository (UDR), and a PDF may request NSSP information from the UDR if necessary and obtain the NSSP information from the UDR. When there is a change in subscription information of the electronic device 101, there may also be a change in information of subscribed slices (subscribed S-NSSAIs) of the electronic device 101 stored in the UDM 206. When there is a change in subscription information of the electronic device 101, there may also be a change in NSSP information stored in a PCF or a UDR. When there is a change in at least one of subscribed S-NSSAIs or an NSSP, relevant configuration information stored in the electronic device 101 may also be required to be updated.

Figure 3:
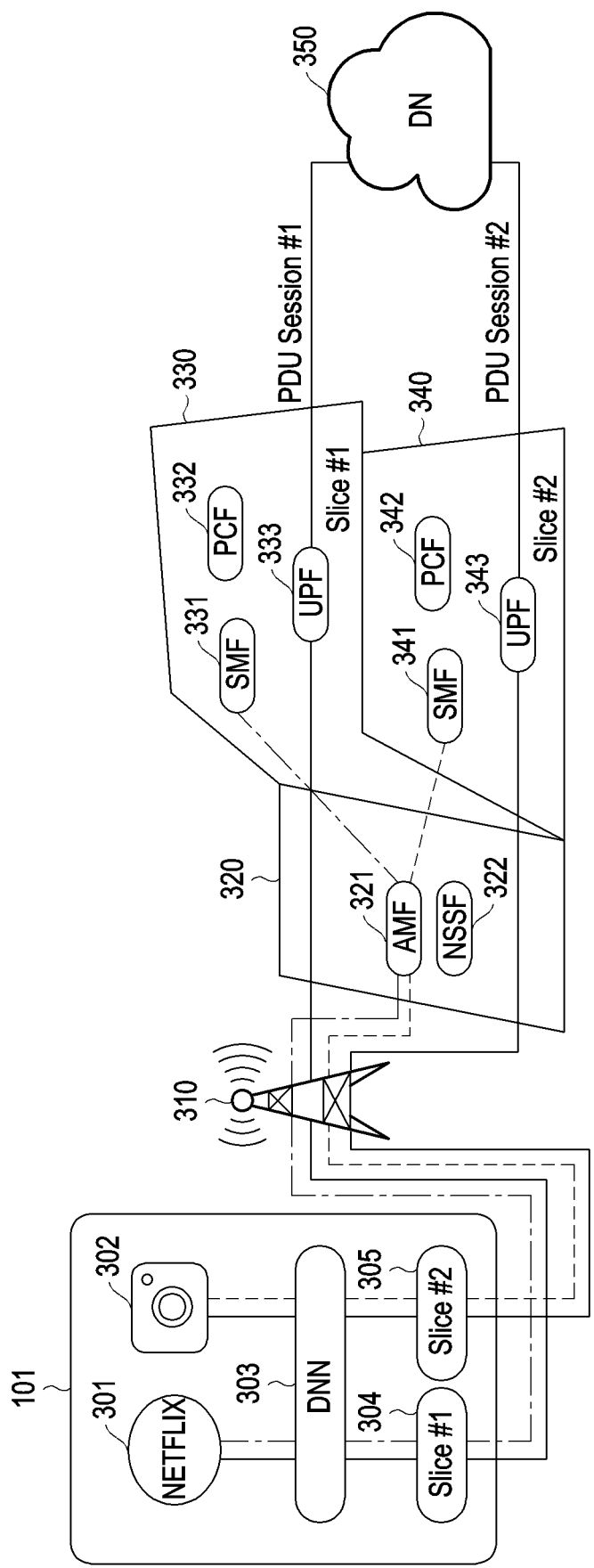
FIG. 3 is a diagram illustrating establishment of a data session for each application according to various embodiments.

FIG. 3 is a diagram illustrating establishment of a data session for each application according to various embodiments.

According to various embodiments, multiple applications 301 and 302 may be executed in the electronic device 101. For example, at least some of the multiple applications 301 and 302 may be stored in the electronic device 101, or at least some thereof may be accessed by the electronic device 101. The multiple applications 301 and 302 may transmit or receive data to or from a data network 350 via, for example, a first DNN. The first application 301 may transmit or receive data to or from the data network 350 via a first network slice 330, and the second application 302 may transmit or receive data to or from the data network 350 via a second network slice 340. The first network slice 330 and the second network slice 340 may include SMFs 331 and 341, PCFs 332 and 342, and UPFs 333 and 343, respectively.

According to various embodiments, the electronic device 101 may be connected to a core 320, 330, and 340 via a (R)AN 310. A part 320 of the core may include an AMF 321 and an NSSF 322, and the electronic device 101 may transmit or receive control data to or from the SMFs 331 and 341 via the AMF 321. The electronic device 101 may transmit or receive data associated with the first application 301 to or from the data network 350 via the UPF 333 of the first network slice 330, and may transmit or receive data associated with the second application 302 to or from the data network 350 via the UPF 343 of the second network slice 340. The electronic device 101 may store information 303 for selection of a first DNN, information 304 for selection of the first network slice 330, and information 305 for selection of the second network slice 340 (e.g., traffic descriptors and/or a route selection descriptors), which are descriptors for route selection. The electronic device 101 may, based on the stored information for route selection, establish a first data session (e.g., PDU session #1) passing via the first network slice 330 and a second data session (e.g., PDU session #2) passing via the second network slice 340. The electronic device 101 may transmit or receive information associated with the first application 301 by using the first data session (PDU session #1), and transmit or receive information associated with the second application 302 by using the second data session (PDU session #2).

For example, the first application 301 may be an application requiring transmission or reception of large amount of data, and the first network slice 330 may support an enhanced mobile broadband (eMBB) characteristic. For example, the second application 302 may be an application requiring low latency transmission or reception of data, and the second network slice 340 may support an ultra-reliable low latency communication (URLLC) characteristic. Accordingly, the first application may transmit or receive large amount of data to or from the data network 350 via the first network slice 330, and the second application may transmit or receive data at a low latency speed via the second network slice 340.

As described above, the electronic device 101 may transmit or receive data (or traffic) via a corresponding network slice for each application. According to various embodiments, the electronic device 101 may assign a network interface for each descriptor (e.g., the information 303 for selection of the first DNN, the information 304 for selection of the first network slice 330, and the information 305 for selection of the second network slice 340). For example, the electronic device 101 may identify a descriptor corresponding to the first application 301, and manage a network interface corresponding to the descriptor. The electronic device 101 may establish a data session (e.g., PDU session #1) by using the corresponding descriptor, and transmit data output via the network interface, by using the data session (e.g., PDU session #1). The electronic device 101 may establish a data session for each network interface, and transmit an IP packet output via the network interface, via a corresponding network slice. The electronic device 101 may transfer an IP packet received via a particular network slice to a corresponding application via a corresponding network interface.

Figure 4:
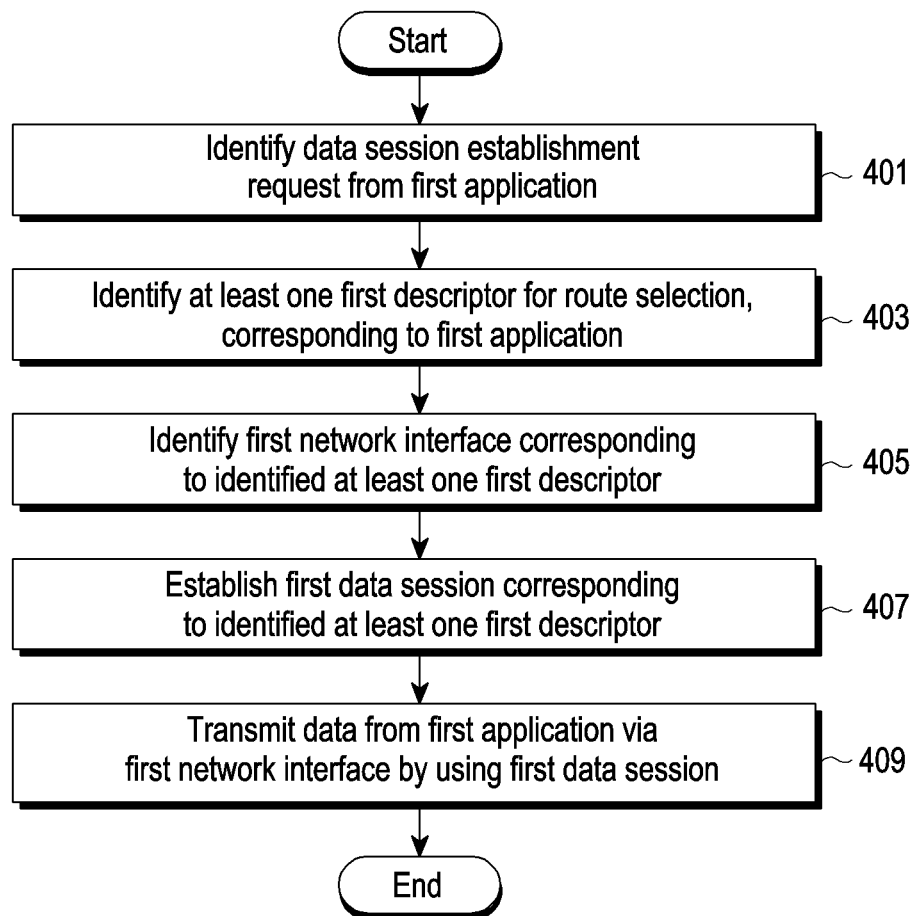
FIG. 4 is a flowchart illustrating an example method of operating an electronic device according to various embodiments.
Figure 5:
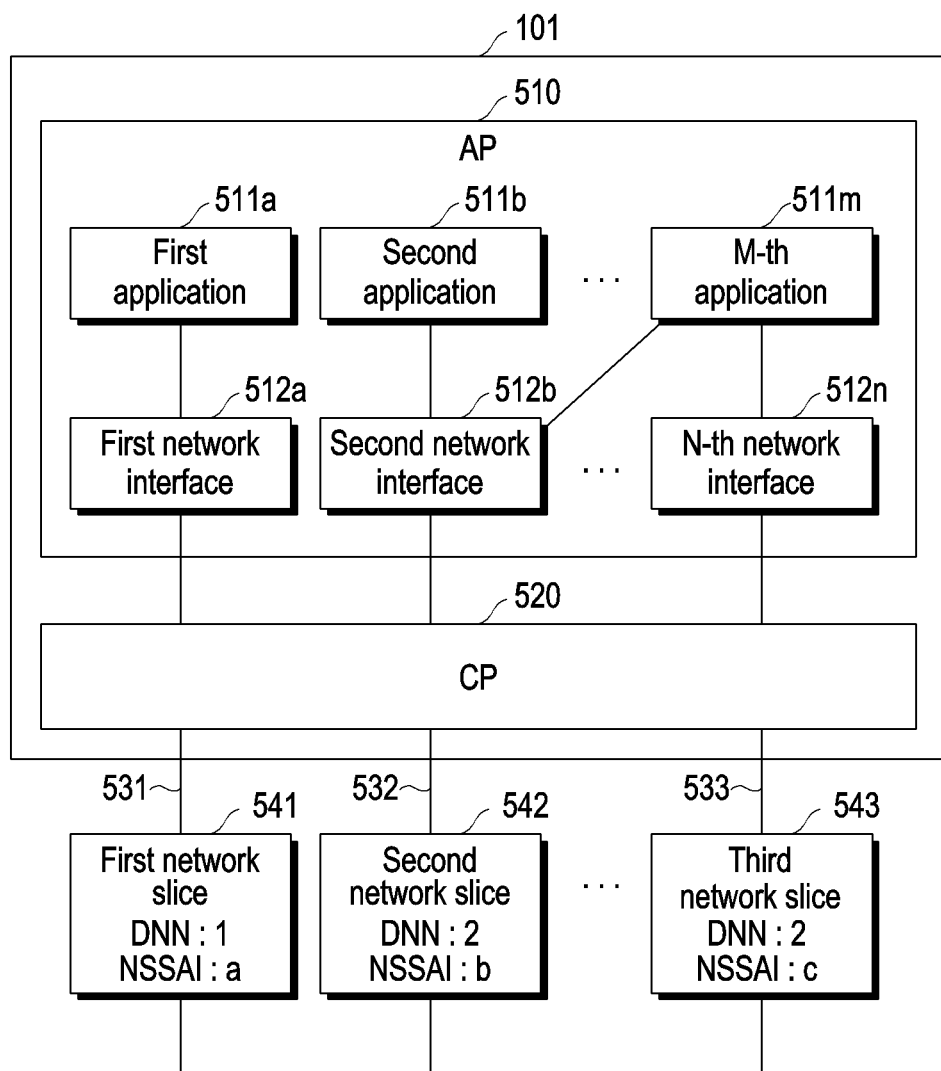
FIG. 5 is a block diagram illustrating an example configuration of an electronic device and network slices according to various embodiments.

FIG. 4 is a flowchart illustrating an example method of operating an electronic device according to various embodiments. FIG. 4 will be described with reference to FIG. 5. FIG. 5 is a block diagram illustrating an example configuration of an electronic device and network slices according to various embodiments.

According to various embodiments, the electronic device 101 may, in operation 401, identify a data session establishment request from a first application. For example, referring to FIG. 5, the electronic device 101 may include an application processor (e.g., including processing circuitry) 510 and a communication processor (e.g., including processing circuitry) 520. The application processor 510 and the communication processor 520 may be included in, for example, the processor 120 in FIG. 1. The application processor 510 and the communication processor 520 may be implemented as separated hardware devices. In another implementation example, the application processor 510 and the communication processor 520 may be implemented as one chip, and the implementation type thereof is not limited. The application processor 510 may execute at least one application (e.g., a first application 511a, a second application 511b, or an m-th application 511m). The at least one application may be stored in an electronic device 510, or may be accessed via a web-browsing application. For example, the first application 511a may be assumed as outputting a data session establishment request. A data session may include, for example, at least one of a session for the first application 511a to communicate with a server associated with the first application 511a, a session to communicate with another device, or a session to communicate with a cloud platform, and is not limited thereto.

According to various embodiments, the electronic device 101 may, in operation 403, identify at least one first descriptor for route selection, corresponding to the first application 511a. The electronic device 101 may identify a rule (e.g., a URSP rule) to be applied to the first application 511a. If there is one rule to be applied to the first application 511a, the electronic device 101 may identify the one rule. If there are multiple rules to be applied to the first application 511a, the electronic device 101 may select one of the multiple rules, and various embodiments of a selection operation will be described later. If there is no rule to be applied to the first application 511a, the electronic device 101 may select a rule suitable for the first application 511a among one or more rules being managed, which will also be described later.

For example, the URSP rule may include a traffic descriptor. A traffic descriptor may include at least one of an application identifier, IP3 tuple(s), a non-IP descriptor, or a DNN according to 3GPP TS 24.524. For example, the URSP rule may include a list of route selection descriptors. The list of route selection descriptors may include, according to, for example, 3GPP TS 23.503, at least one of information for selection of a network slice, information for selection of a DNN, information for selection of an SSC mode, information for selection of a PDU session type, non-seamless offload indication information, or access type preference information. For example, if one or more DNNs are included in a traffic descriptor, a route selection descriptor may not include a DNN. Various embodiments of the disclosure are not necessarily limited to 3GPP TS 23.503 and/or 3GPP TS 24.526, and a person skilled in the art would understand that a descriptor in various embodiments of the disclosure may include different information. The information for selection of a network slice may be, for example, a single value or a list of values of S-NSSAI(s). The information for selection of a DNN may be, for example, a single value or a list of values of DNN(s). The information for selection of an SSC mode may be, for example, a single value of an SSC mode. The information for selection of a PDU session type may include, for example, one single value of a PDU session type. The non-seamless offload indication information may indicate, for example, whether data of a matching application is offloaded to non-3GPP access outside of a PDU session. The access type preference information may indicate, for example, an access type (3GPP or non-3GPP) preferred in a case where a user equipment establishes a PDU session for a matching application. As described above, the electronic device 101 may identify at least one first descriptor corresponding to the first application 511a. The at least one first descriptor may include, for example, at least some of descriptors included in the above traffic descriptor or descriptors included in the above route selection descriptor. At least one descriptor may correspond to an application and, in other words, one descriptor set may correspond to an application.

According to various embodiments, referring to FIG. 5, the application processor 510 may generate (or define or assign) at least one network interface 512a, 512b, and 512n. The network interface 512a, 512b, and 512n may be, for example, an interface for data transmission or reception between the application processor 510 and the communication processor 520, and may be named, for example, "rmnet". The number (n) of the network interface 512a, 512b, and 512n may be, for example, smaller than or equal to the number (m) of the applications 511a, 511b, and 511m, but is not limited thereto. The electronic device 101 may associate (or match or assign) a network interface for each descriptor (e.g., each descriptor set of an application) of an application. For example, the electronic device 101 may associate the first descriptor (e.g., DNN:1 and N-SSAI:a)(or a first descriptor set) corresponding to the first application 511a with the first network interface 512a, and may associate a second descriptor (e.g., DNN:2 and N-SSAI:b)(or a second descriptor set) corresponding to the second application 511b with the second network interface 512b. In various embodiments, the m-th application 511m may correspond to multiple descriptors (e.g., the second descriptor (e.g., DNN:2 and N-SSAI:b) and a third descriptor (DNN:2 and N-SSAI:c))(or multiple descriptor sets). The electronic device 101 may associate the second descriptor (e.g., DNN:2 and N-SSAI:b) corresponding to the third application 511m with the second network interface 512b, and may associate the third descriptor (DNN:2 and N-SSAI:c) with the n-th network interface 512n. According to various embodiments, the application processor 510 may share association information between a network interface and a descriptor with the communication processor 520. A network interface may indicate a logical interface between the application processor 510 and the communication processor 520.

According to various embodiments, the electronic device 101 may, in operation 405, identify the first network interface 512a corresponding to the identified at least one first descriptor. In operation 407, the electronic device 101 may establish a first data session 531 corresponding to the identified at least one first descriptor. For example, the application processor 510 may provide information (or a parameter) (e.g., the first descriptor) for establishment of the first data session 531 to the communication processor 520. The communication processor 520 may establish the first data session 531, based on the received information (e.g., the first descriptor). The communication processor 520 may identify the first data session 531 being associated with the first network interface 512a. The first data session 531 may be established based on the first network slice 541.

According to various embodiments, the electronic device 101 may, in operation 409, transmit data from the first application via the first network interface using the first data session 531. For example, the application processor 510 may transfer data from the first application 511a to the communication processor 520 via the first network interface 512a. The communication processor 520 may, based on the first network interface 512a being associated with the first data session 531, transmit data provided via the first network interface 512a, to a data network via the first network slice 531.

According to various embodiments, where data is received via the first network slice 531, the communication processor 520 may provide the received data to the first network interface 512a. The application processor 512a may transfer the data received via the first network interface 512a to the first application 511a. According to the above description, the electronic device 101 may transmit or receive data to or from a data network via a network slice suitable for each application.

According to various embodiments, the electronic device 101 may establish a second data session 532, based on the second descriptor (e.g., DNN:2 and N-SSAI:b) associated with the second application 511b. The electronic device 101 may establish a third data session 533, based on the third descriptor (e.g., DNN:2 and N-SSAI:c) associated with the m-th application 511m. The electronic device 101 may transmit or receive data associated with the second application 511b to or from the second network slice 542 via the second network interface 512b. The electronic device 101 may transmit or receive data associated with the second network slice 542 from the m-th application 511m, to or from the second network slice 542 via the second network interface 512b. The electronic device 101 may transmit or receive data associated with the n-th network slice 543 from the m-th application 511m, to or from the third network slice 543 via the n-th network interface 512n. When data is provided from a particular network interface, the communication processor 520 may transmit the data to a corresponding network interface without determining from which application the data is provided.

Figure 6:
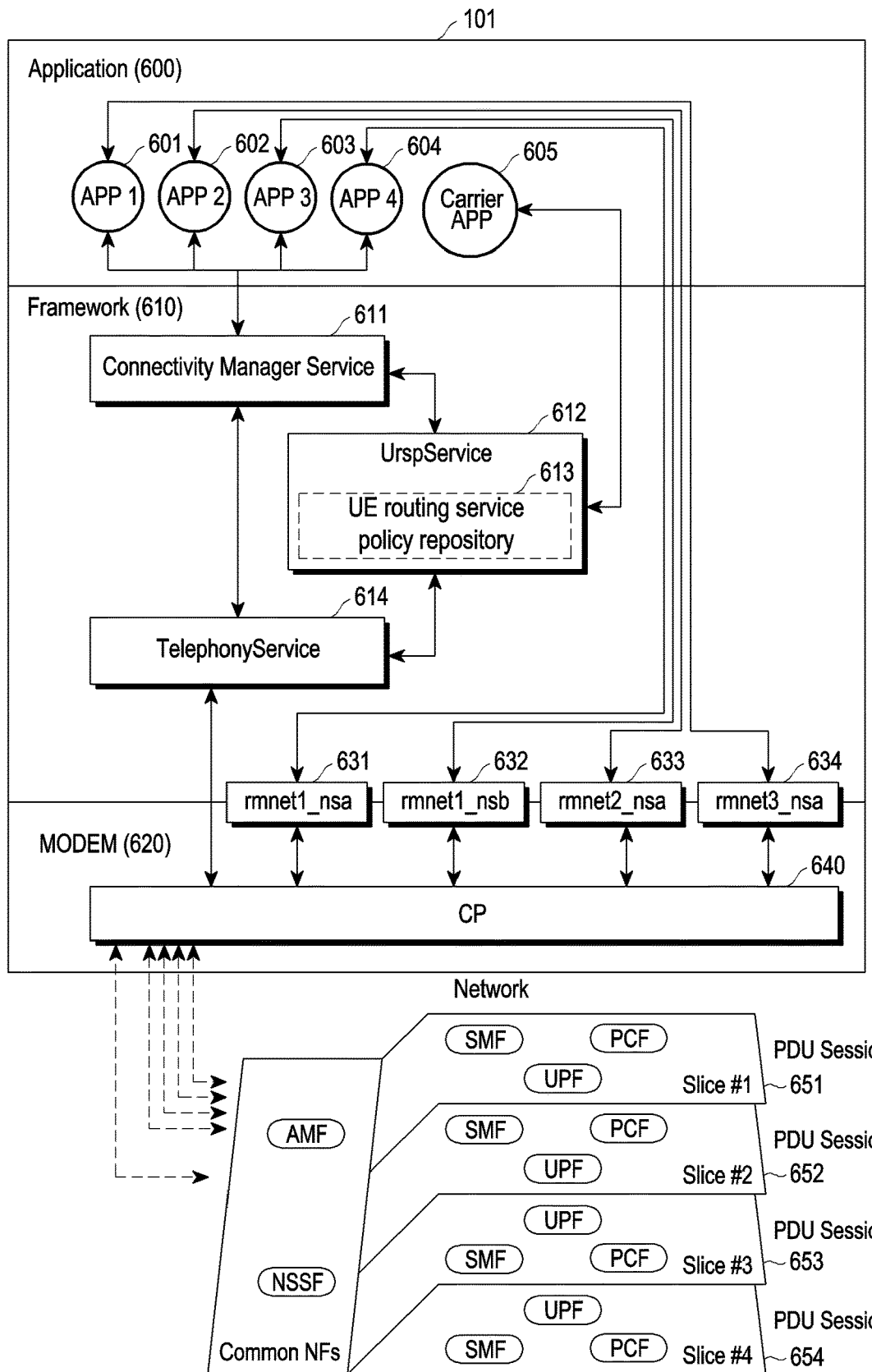
FIG. 6 is a block diagram illustrating an example configuration of an electronic device according to various embodiments.

FIG. 6 is a block diagram illustrating an example configuration of an electronic device according to various embodiments.

According to various embodiments, in the electronic device 101, an application layer 600, a framework layer 610, and a hardware layer 620 corresponding to a modem may be defined.

According to various embodiments, in the application layer 600, applications 601, 602, 603, and 604 and a carrier application 605 may be executed. The carrier application 605 is an application provided by a network service provider and, for example, may include information of a network slice to be used. The corresponding information may be stored in a URSP repository 613. The URSP repository 613 may be included in, for example, an application processor (e.g., including processing circuitry), a communication processor (e.g., including processing circuitry) 640, or a different memory (e.g., the memory 130 in FIG. 1).

According to various embodiments, the framework layer 610 may include at least one of ConnectivityManagerService 611, UrspService 612, or TelephoneyService 614. An operation of ConnectivityManagerService 611, UrspService 612, or TelephoneyService 614 may indicate an operation of the application processor or the electronic device 101.

According to various embodiments, ConnectivityManagerService 611 may identify a network slice allowed for an application, based on a rule (e.g., a URSP rule). ConnectivityManagerService 611 may provide information about an allowed network slice to an application. The application may specify a network slice, based on the received information, and request establishment of a data session.

ConnectivityManagerService 611 may provide, to TelephonyService 614, information required for establishing a data session (e.g., a PDU session), which is information required for using an allowed network slice.

According to various embodiments, UrspService 612 may store a received rule in the URSP repository 613. UrspService 612 may provide an API allowing an application to take an available rule. UrspService 612 may configure one application to use two or more network slices, which will be described later. Where an application explicitly requests a network slice to use, UrspService 612 may provide a function of determining whether the application is able to be connected to the network slice. Where an application does not explicitly request a network slice to use, UrspService 612 may provide a function of selecting a network slice suitable for the application. UrspService 612 may provide a function of determining whether an application has an authority to use a particular network slice. UrspService 612 may provide a function of determining whether an application to use a particular network slice is forged or falsified. UrspService 612 may determine a network interface, based on a received rule, and transfer same to TelephoneyService 614.

According to various embodiments, TelephoneyService 614 may include a radio interface layer (RIL). TelephoneyService 614 may provide, to the communication processor 640, which rule for which each network interface 631, 632, 633, and 634 is to be used. For example, TelephoneyService 614 may receive association information between a rule and a network interface from UrspService 612, and provide same to the communication processor 640. For example, an operation of TelephoneyService 614 may be performed by the application processor, and accordingly, the expression that information is transferred from the framework layer 610 to the communication processor 640 may refer, for example, to the application processor transferring information to the communication processor 640. In addition, the expression that information is transferred from the communication processor 640 to the framework layer 610 may refer, for example, to the communication processor 640 transferring information to the application processor. When an application requests establishment of a data session (e.g., a PDU session) for using a network slice allowed by a rule, TelephoneyService 614 may transfer, to the communication processor 640, information (e.g., a traffic descriptor and/or a route selection descriptor) required for establishment of the data session. TelephoneyService 614 may provide, to UrspService 612, an URSP rule received from a PCF via the communication processor 640.

According to various embodiments, the communication processor 640 may receive association information between a network interface and a rule (e.g., a descriptor) from the application processor, and store same in an internal memory (e.g., the memory 130 in FIG. 1) of the communication processor 640 or an external memory. For example, in an example of FIG. 6, the communication processor 640 may receive from the application processor, and store information indicating that rules (e.g., descriptors) allowed for the respective first, second, third, and fourth applications 601, 602, 603, and 604 are used for the first, second, third, and fourth network interfaces 631, 632, 633, and 634. For example, the electronic device 101 may configure an identifier of a network interface in a form of "rmnet #(DNN identification information) #' (network slice identification information)". The DNN identification information may be represented by 0 in a case of ims and 1 in a case of internet, but this merely corresponds to an example. The network slice identification information may be configured as nsa or nsb as in FIG. 6, but the scheme is not limited thereto, and a method of configuring an identifier of a network interface will be described later with reference to FIG. 12.

The communication processor 640 may receive a data session establishment request from the application processor. The data session establishment request may include a rule (e.g., a descriptor). The communication processor 640 may establish a data session (e.g., a PDU session), based on the received rule (e.g., a descriptor). The communication processor 640 may establish a data session in associated with, for example, each of first, second, third, and fourth network interfaces 651, 652, 653, and 654. When data is received via a particular network interface, the communication processor 640 may transmit the data by using a corresponding data session. For example, data from the second application 602 may be transferred to the communication processor 640 via the second network interface 632. The communication processor 640 may transmit the data from the second network interface 632 by using a second data session established using a corresponding descriptor. When data is received from the outside by using a particular data session, the communication processor 640 may transfer the data to a corresponding application via a corresponding network interface. For example, when data is received from the outside by using the second data session, the communication processor 640 may transfer the received data to the second network interface 632. The application processor may provide the data received via the second network interface 632 to the second application 602 that is a corresponding application.

Figure 7:
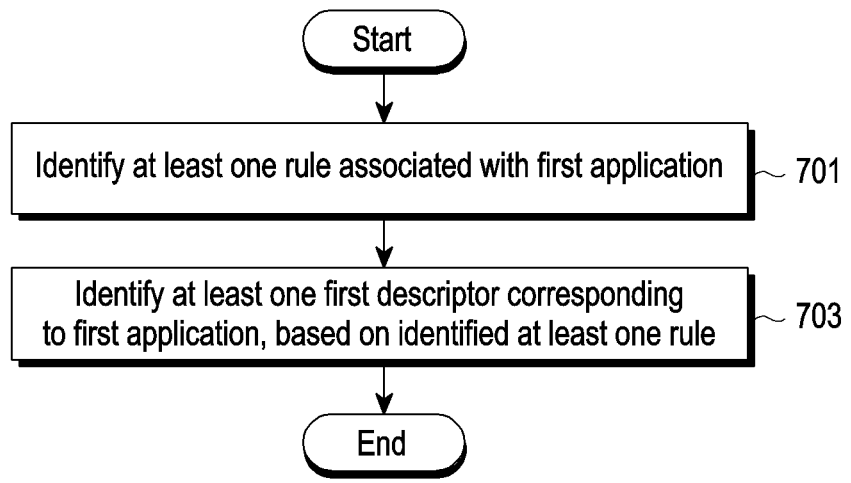
FIG. 7 is a flowchart illustrating an example method of operating an electronic device according to various embodiments.
Figure 8:
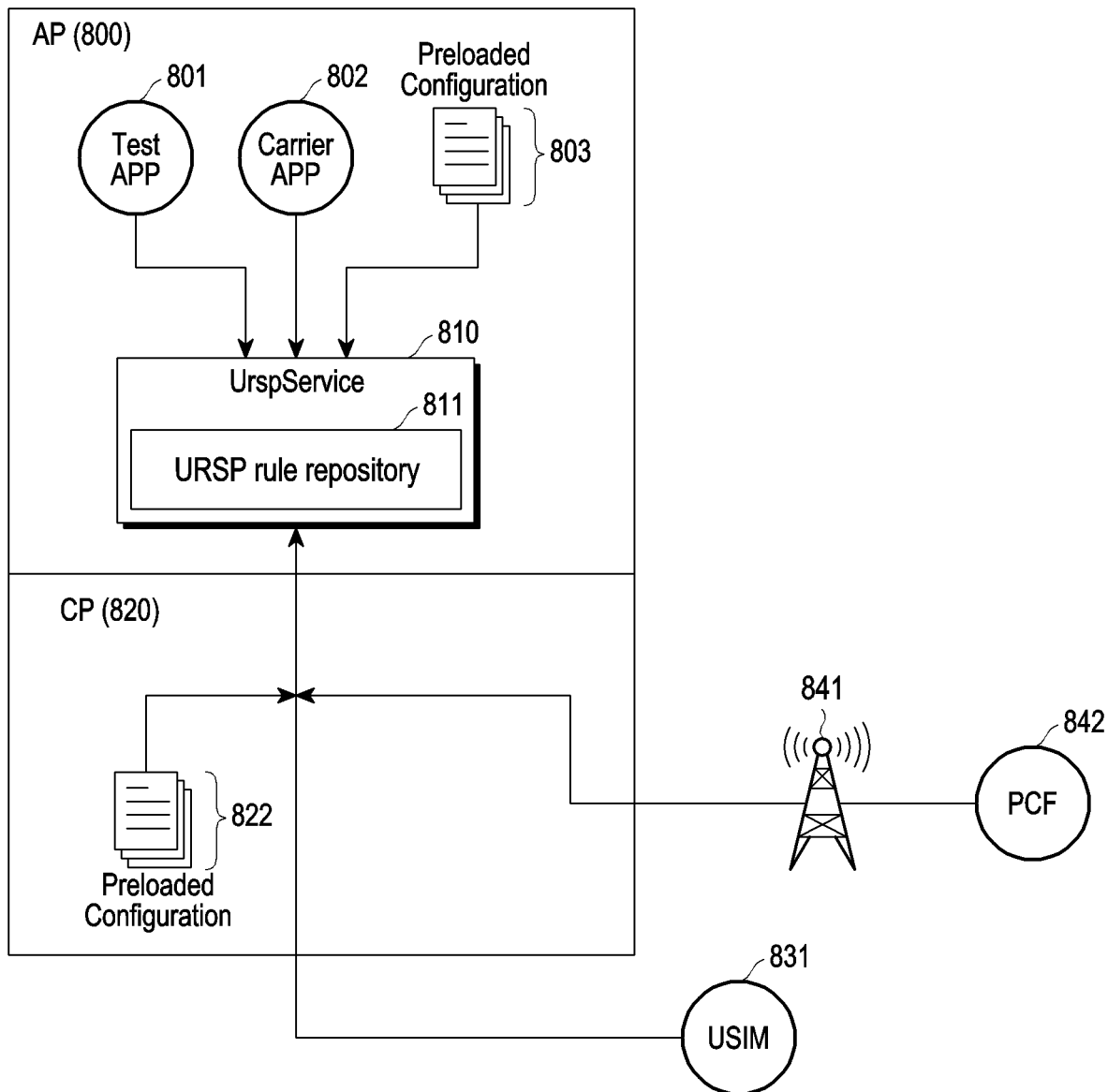
FIG. 8 is a diagram illustrating an example descriptor selection operation according to various embodiments.

FIG. 7 is a flowchart illustrating an example method of operating an electronic device according to various embodiments. FIG. 7 will be described with reference to FIG. 8. FIG. 8 is a diagram illustrating an example descriptor selection operation according to various embodiments.

According to various embodiments, the electronic device 101 may, in operation 701, identify at least one rule associated with a first application. Referring to FIG. 8, an application processor (e.g., including processing circuitry) 800 may obtain a rule from one of a test application 801, a carrier application 802, or pre-loaded configurations 803 and 822. For example, rules may be transferred to UrspService 810 using an API of setUrspRule. Although not illustrated, an application may obtain a rule stored for each application by using an API of getUrspRule.

According to various embodiments, the test application 801 is an application, for example, made for test, and may include information of a network slice to use, and the application processor 800 may obtain and store the corresponding information. The carrier application 802 is provided by a service provider, and may include information of a network slice to use, and the application processor 800 may obtain and store the corresponding information. The preloaded configurations 803 and 822 may include information of a network slice to be used by a particular application by reflecting at least one of a service provider policy and a terminal vendor policy, and the application processor 800 may obtain and store the corresponding information. The preloaded configurations 803 and 822 may be stored in the application processor 800 and/or the communication processor 820. The above information may be, for example, obtained by UrspService 810, and may be stored in a URSP rule repository 811. The position of the URSP rule repository 811 is illustrated as being in UrspService 810 in FIG. 8, but this is an example, and is not limited.

According to various embodiments, the application processor 800 may receive a rule relayed from the communication processor 820. For example, a PCF 842 may have information about a network slice to be used by a particular application. The communication processor 820 may receive the corresponding information from the PCF 842 via a RAN 841, and transfer same to the application processor 800. A universal subscriber identity module (USIM) 831 has information about a network slice to be used by a particular application. The communication processor 820 may receive the corresponding information from the USIM 831, and transfer same to the application processor 800.

According to various embodiments, the electronic device 101 may, in operation 703, identify at least one first descriptor corresponding to the first application, based on the identified at least one rule. The electronic device 101 may, for example, select a rule when multiple rules for the first application are identified. For example, the electronic device 101 may select one rule, based on a subject which configures a rule. For example, the electronic device 101 may configure a priority of each rule according to a subject which configures a rule. For example, the electronic device 101 may configure the highest priority for a rule (e.g., a rule configured by the carrier application 802) selected by a service provider, configure a next highest ranking for a rule (e.g., a rule configured by the PCF 842) configured by a network, configure a next highest ranking for a rule configured by the USIM 831, and configure a next highest ranking for a rule configured by the preloaded configurations 803 and 822. However, this merely corresponds to an example. The electronic device 101 may select a rule, for example, a descriptor set according to priority comparison.

For example, Table 1 shows a rule received by the electronic device 101 from the PCF 842.

TABLE 1

| Rule Precedence = 1 Traffic Descriptor: Application Identifiers = App1 (aaa.bbb.ccc.pkg) | Route Selection Descriptor Precedence = 1 Network Slice Selection: S-NSSAI1-nsa SSC Mode Selection: SSC Mode 1 DNN Selection: abc.com Access Type preference: 3GPP access | When App1 request a network, a UE uses a PDU session having a DNN of abc.com and a network slice of S-NSSAI1-nsa. |
|---|---|---|

Table 2 shows a rule configured by the USIM 831 for the electronic device.

TABLE 2

| Rule Precedence = 1 Traffic Descriptor: Application Identifiers = App1 (aaa.bbb.ccc.pkg) | Route Selection Descriptor Precedence = 1 Network Slice Selection: S-NSSAI1-nsc SSC Mode Selection: SSC Mode 1 DNN Selection: efg.com Access Type preference: 3GPP access | When App1 request a network, a UE uses a PDU session having a DNN of egf.com and a network slice of S-NSSAI1-nsc. |
|---|---|---|

The electronic device 101 may select the rule in Table 1 as a rule to be applied to the first application, based on the priority of the rule of Table 1 configured by the PCF 842 being higher than that of the rule of Table 2 configured by the USIM 831. Even after the selection, if a rule (e.g., a rule configured by a service provider) having a higher priority is obtained, the electronic device 101 may change the rule that has already been configured. The application processor 800 may, for example, map, to a first network interface, at least a part of a descriptor (e.g., Network Slice Selection: S-NSSAI1-nsa, SSC Mode Selection: SSC Mode 1, DNN Selection: abc.com, Access Type preference: 3GPP access) from the rule of Table 1. The application processor 800 may transfer, to the communication processor 820, mapping relation between the first network interface and the at least a part of the descriptor from the rule of Table 1. Thereafter, when a PDU session establishment request is obtained from the first application, the application processor 800 may transfer at least a part of information (e.g., Network Slice Selection: S-NSSAI1-nsa, SSC Mode Selection: SSC Mode 1, DNN Selection: abc.com, Access Type preference: 3GPP access) for establishment of a PDU session to the communication processor 820. The communication processor 820 may establish a PDU session by using at least a part of information (e.g., Network Slice Selection: S-NSSAI1-nsa, SSC Mode Selection: SSC Mode 1, DNN Selection: abc.com, Access Type preference: 3GPP access) for establishment of the PDU session, and the PDU session may be established based on a DNN of abc.com and a network slice of S-NSSAI1-nsa. Thereafter, the application processor 800 may transfer an IP packet from the first application, to the communication processor 820 via the first network interface, and the communication processor 820 may transmit the IP packet received via the first network interface to a DNN of abc.com and a network slice of S-NSSAI1-nsa.

The electronic device 101 according to various embodiments may manage a rule to be applied for each application as in Table 3.

TABLE 3

| Rule Precedence = 1 Traffic Descriptor: Application Identifiers = App1 (aaa.bbb.ccc.pkg) | Route Selection Descriptor Precedence = 1 Network Slice Selection: S-NSSAI1-nsa SSC Mode Selection: SSC Mode 1 DNN Selection: abc.com Access Type preference: 3GPP access | When App1 request a network, a UE uses a PDU session having a DNN of abc.com and a network slice of S-NSSAI1-nsa. |
|---|---|---|
| Rule Precedence = 2 Traffic Descriptor: Application Identifiers = App2 (ddd.eee.fff.pkg) | Route Selection Descriptor Precedence = 1 Network Slice Selection: S-NSSAI2-nsb SSC Mode Selection: SSC Mode 1 DNN Selection: efg.com Access Type preference: 3GPP access | When App2 request a network, a UE uses a PDU session having a DNN of efg.com and a network slice of S-NSSAI2-nsb. |

The electronic device 101 may also select one among one or more rules for a second application, and manage same in associated with the second application. As described above, the electronic device 101 may manage rules for multiple applications, and configure a network interface and establish a PDU session based on the rules.

Figure 9:
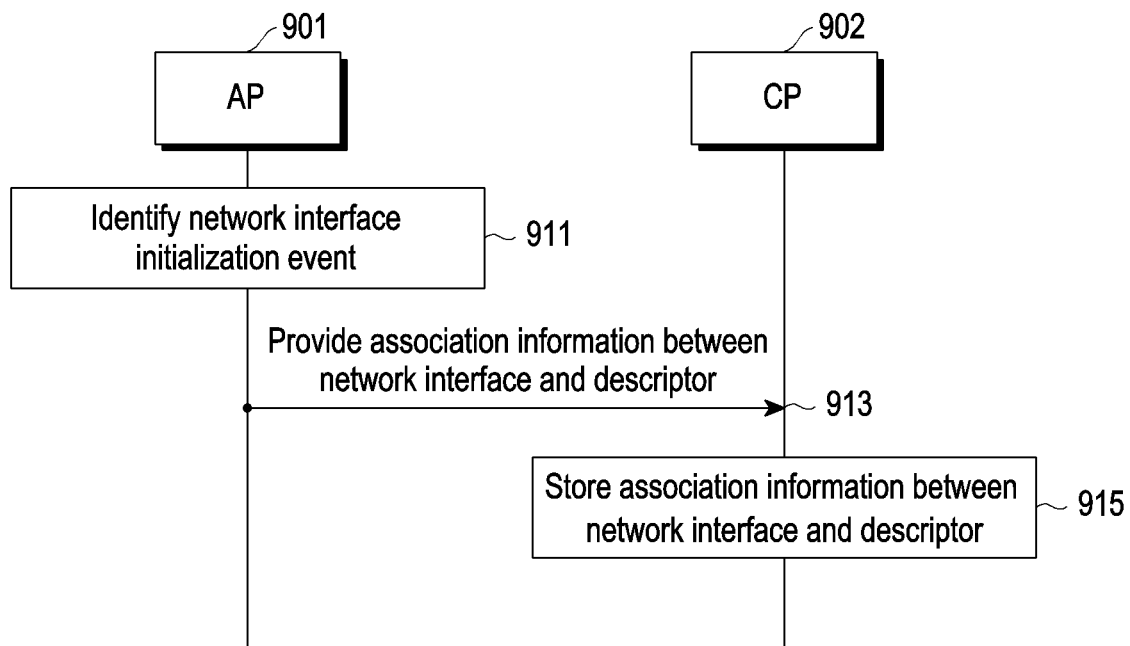
FIG. 9 is a signal flow diagram illustrating an example method of operating an application processor and a communication processor of an electronic device according to various embodiments.

FIG. 9 is a signal flow diagram illustrating an example method of operating an application processor and a communication processor of an electronic device according to various embodiments.

According to various embodiments, an application processor 901 may, in operation 911, identify a network interface initialization event. For example, the network interface initialization event may include at least one among booting of a communication processor (or modem), loading of a SIM, a change of a rule applied to a particular application, installation of an application, removal of an application, activation of an application, deactivation of an application, or a user input. However, there is no limit.

According to various embodiments, the application processor 901 may, in operation 913, provide association information between a network interface and a descriptor to a communication processor 902. In operation 915, the communication processor 902 may store the association information between the network interface and the descriptor. For example, TelephonyService may provide association information between a network interface and a descriptor to the communication processor 902. The association information between the network interface and the descriptor may include at least one of a network interface device name, IP version handle(s), a traffic descriptor, or a route selection descriptor, but there is no limit. For example, Table 4 shows an example of association information between a network interface and a descriptor according to various embodiments.

TABLE 4

| Network Interface device name | Descriptor |
|---|---|
| rmnet1_nsA | IP version Handle(s): 0x01, 0x02<br>Traffic Descriptors: DNN_1<br>Route Selection Descriptors: NSSAI-a |
| rmnet2_nsB | IP version Handle(s): 0x03, 0x04, 0x05, 0x06<br>Traffic Descriptors: DNN_2<br>Route Selection Descriptors: NSSAI-b |

For example, for a network interface of "rmnet1_nsA", IP version handles may be configured to be 0x01 and 0x02. IP version handles may be intrinsic values transmitted or received to or from the communication processor 902 in order to perform IPv4 and IPv6-related processing for each network interface, and 0x01 and 0x02 may correspond to IPv4 and IPv6, respectively. For "rmnet2_nsB", 0x03 and 0x04 that correspond to IPv4 and IPv6, and 0x05 and 0x06 that are additional IP version handles for supporting ssc mode 3 may be configured. In addition, a descriptor may also include a traffic descriptor and/or a route configuration descriptor. The communication processor 902 may store association information between a network interface and a descriptor, and then use later same for data session establishment, data session management, and/or determination of a data transmission/reception path for each network interface. According to various embodiments, the application processor 901 and the communication processor 902 may configure a dedicated descriptor for each network interface as in Table 5.

TABLE 5

| Network Interface Name | Traffic descriptor, Route Selection Descriptor |
|---|---|
| rmnet0 | DNN1, NSSAI a |
| rmnet1 | DNN1, NSSAI b |
| rmnet2 | DNN2, NSSAI c |
| ... | ... |
| Rmnet# | DNN#, NSSAI # |

The application processor 901 may transmit data from a particular application, to the communication processor 902 via a network interface corresponding to a descriptor from a rule applied to the particular application. The communication processor 902 may transmit the data received via the corresponding network interface, by using a data session established based on the descriptor.

Figure 10A:
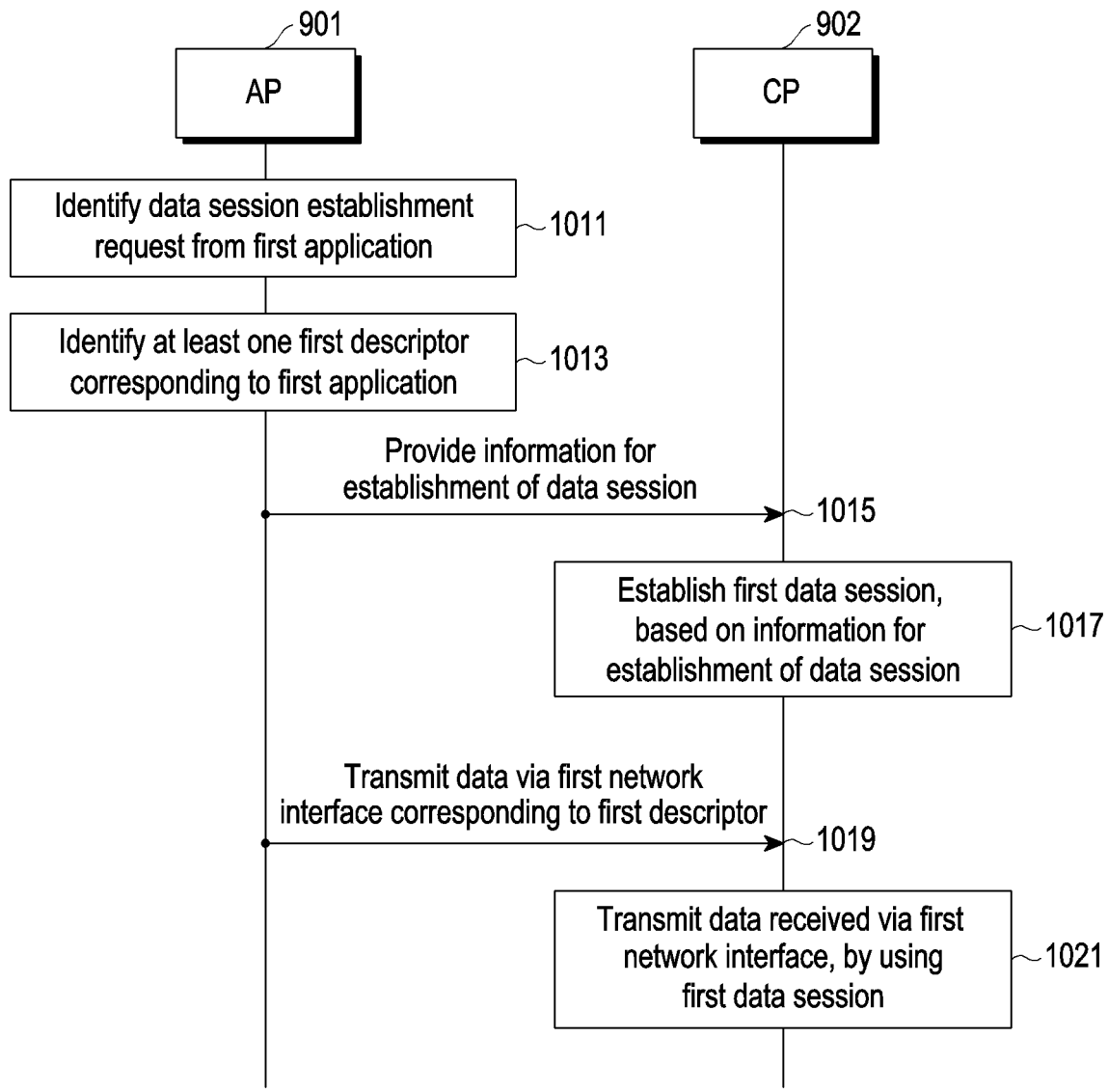
FIG. 10A is a signal flow diagram illustrating an example method of operating an application processor and a communication processor of an electronic device according to various embodiments.

FIG. 10A is a signal flow diagram illustrating an example method of operating an application processor and a communication processor of an electronic device according to various embodiments.

According to various embodiments, the application processor 901 may, in operation 1011, identify a data session establishment request from a first application. In operation 1013, the application processor 901 may identify at least one first descriptor corresponding to the first application. The application processor 901 may, in operation 1015, provide information for establishment of a data session to the communication processor 902. The information for establishment of a data session may include at least one of a traffic descriptor, a route selection descriptor, or an IP version handle(s). For example, the application processor 901 may manage association information between a network interface and a descriptor as in Table 4. The application processor 901 may identify a data session establishment request from the first application. A descriptor corresponding to the first application may include IP version Handle(s): 0x01, 0x02, Traffic Descriptors: DNN_1, Route Selection Descriptors: NSSAI-a in Table 4. The application processor 901 may provide a descriptor (e.g., IP version Handle(s): 0x01, 0x02, Traffic Descriptors: DNN_1, Route Selection Descriptors: NSSAI-a in Table 4) as information for establishment of a data session to the communication processor 902. A traffic descriptor may include a fully qualified domain name (FQDN).

According to various embodiments, the communication processor 902 may, in operation 1017, establish a first data session, based on the information for establishment of a data session. If the communication processor 902 has received a descriptor (e.g., IP version Handle(s): 0x01, 0x02, Traffic Descriptors: DNN_1, Route Selection Descriptors: NSSAI-a in Table 4), the communication processor may establish a first data session based on the descriptor. The established first data session may be associated with a network slice of NSSAI-a. When network slices are different from each other even when DNNs are the same, the communication processor 902 may establish different data sessions.

According to various embodiments, the application processor 901 may, in operation 1019, transmit data via a first network interface corresponding to the first descriptor. For example, the application processor 901 may transmit data via the first network interface of rmnet1_nsA corresponding to the first descriptor (e.g., IP version Handle(s): 0x01, 0x02, Traffic Descriptors: DNN_1, Route Selection Descriptors: NSSAI-a in Table 4). The communication processor 902 may, in operation 1021, transmit the data received via the first network interface (e.g., rmnet1_nsA), using the first data session. Although not illustrated, the communication processor 902 may provide data received using the first data session, to the application processor 901 via the first network interface (e.g., rmnet1_nsA). The application processor 901 may provide data received via the first network interface (e.g., rmnet1_nsA) to the corresponding first application.

Figure 10B:
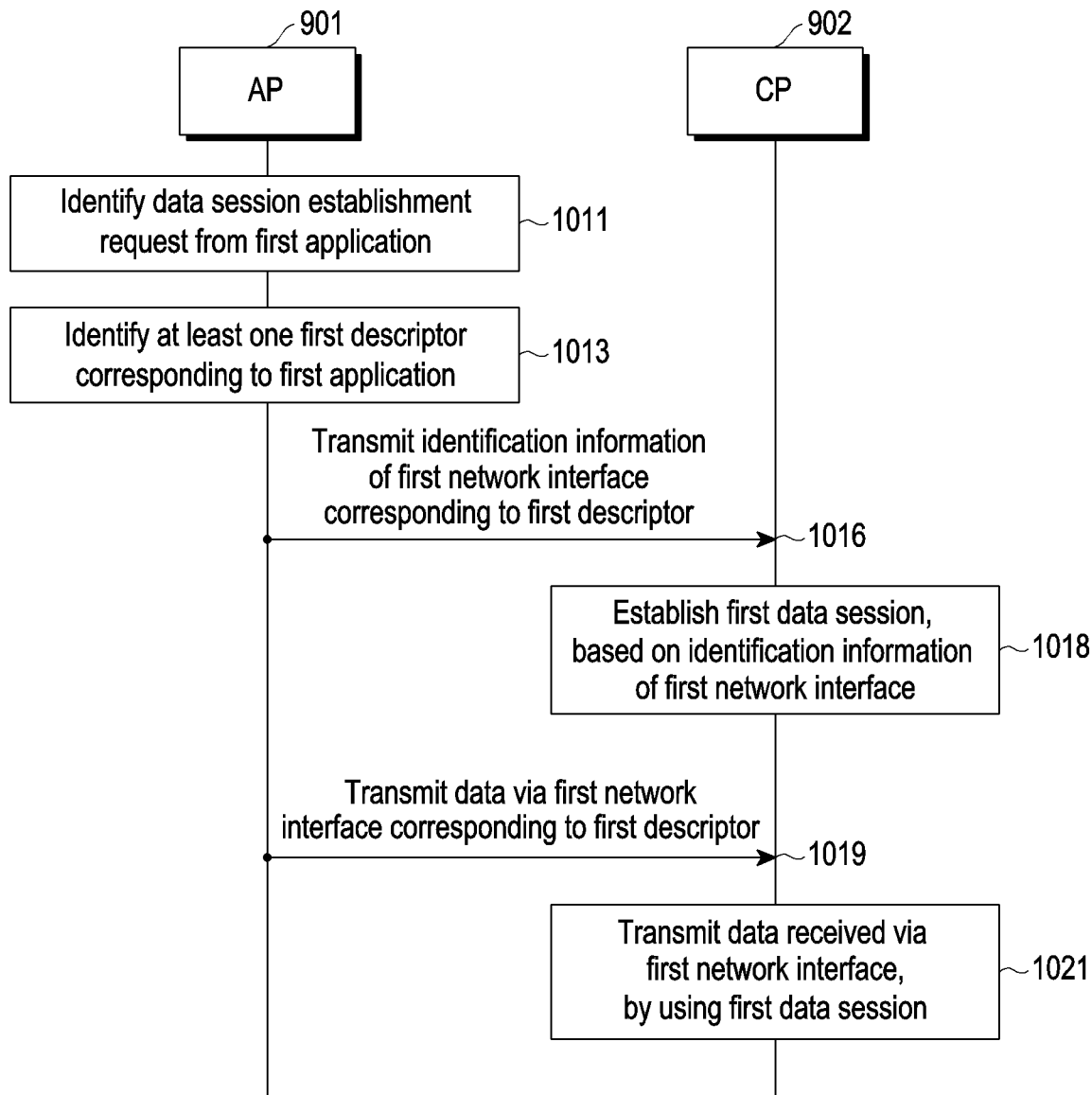
FIG. 10B is a signal flow diagram illustrating an example method of an application processor and a communication processor of an electronic device according to various embodiments.

FIG. 10B is a signal flow diagram illustrating an example method of operating an application processor and a communication processor of an electronic device according to various embodiments.

According to various embodiments, the application processor 901 may, in operation 1011, identify a data session establishment request from a first application. The application processor 901 may, in operation 1013, identify at least one first descriptor corresponding to the first application. The application processor 901 may, in operation 1016, transmit identification information of a first network interface corresponding to the first descriptor to the communication processor 902. For example, the application processor 901 may manage association information between a network interface and a descriptor as in Table 4. The application processor 901 may identify a data session establishment request from the first application. The application processor may identify the first network interface (e.g., rmnet1_nsA) mapped to a descriptor corresponding to the first application. The application processor 901 may provide the first network interface (e.g., rmnet1_nsA) to the communication processor 902.

According to various embodiments, in operation 1018, the communication processor 902 may establish a first data session, based on the identification information of the first network interface (e.g., rmnet1_nsA). The communication processor 902 may manage association information between a network interface and a descriptor as in Table 4. The communication processor 902 may identify a descriptor (e.g., IP version Handle(s): 0x01, 0x02, Traffic Descriptors: DNN_1, Route Selection Descriptors: NSSAI-a in Table 4) mapped to the first network interface (e.g., rmnet1_nsA), based on the association information between the network interface and the descriptor. The communication processor 902 may establish a data session, based on the identified descriptor (e.g., IP version Handle(s): 0x01, 0x02, Traffic Descriptors: DNN_1, Route Selection Descriptors: NSSAI-a in Table 4). According to various embodiments, the application processor 901 may, in operation 1019, transmit data to the communication processor 902 via the first network interface corresponding to the first descriptor. In operation 1021, the communication processor 902 may transmit the data received via the first network interface, using the first data session.

Figure 11:
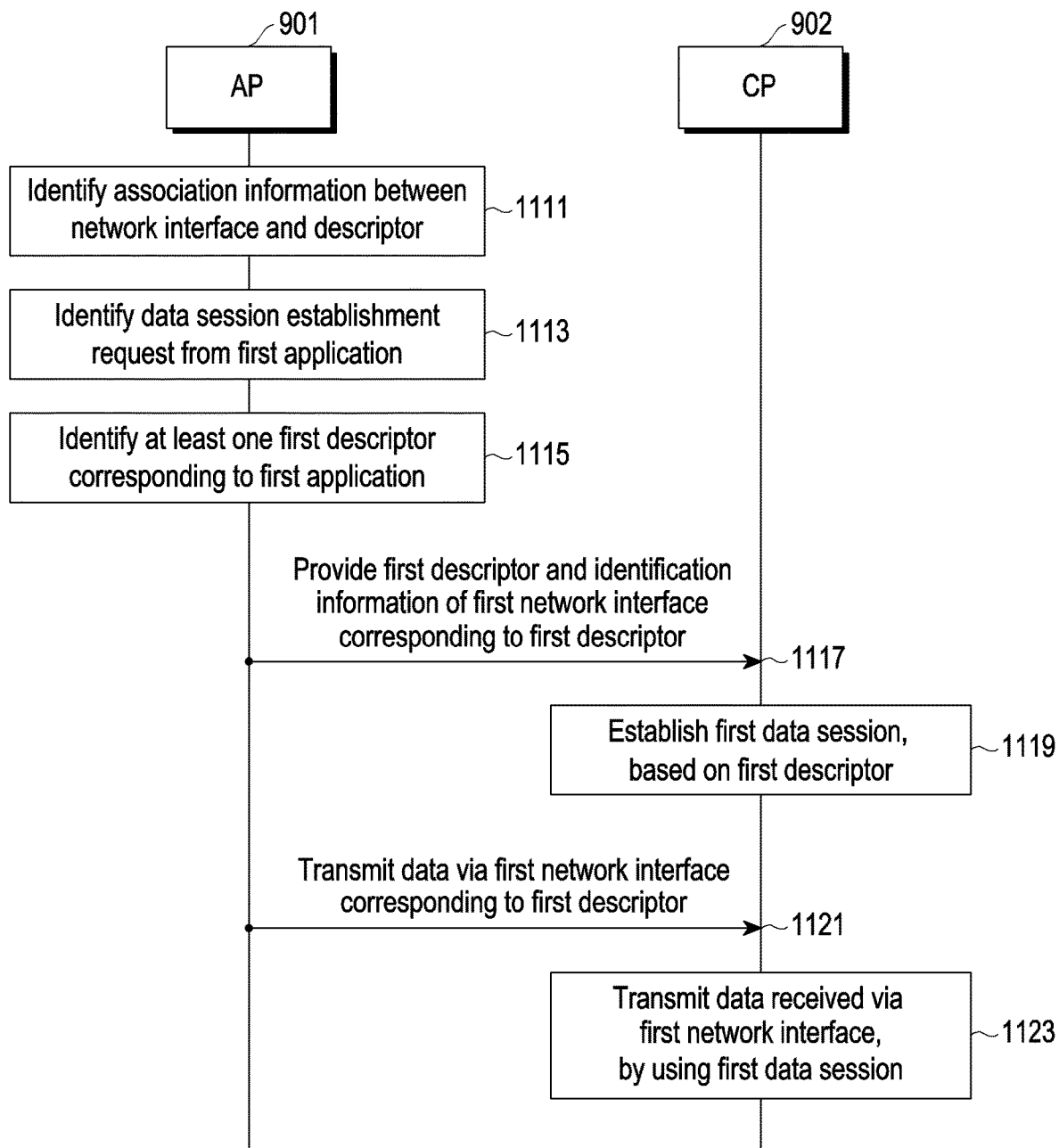
FIG. 11 is a signal flow diagram illustrating an example method of operating an application processor and a communication processor of an electronic device according to various embodiments.

FIG. 11 is a signal flow diagram illustrating an example method of operating an application processor and a communication processor of an electronic device according to various embodiments.

According to various embodiments, the application processor 901 may, in operation 1111, identify association information between a network interface and a descriptor. For example, the application processor 901 may manage association information between a network interface and a descriptor as in Table 4. In FIG. 11, the communication processor 902 may not receive association information between a network interface and a descriptor from the application processor 901 in advance.

According to various embodiments, the application processor 901 may, in operation 1113, identify a data session establishment request from a first application. In operation 1115, the application processor 901 may identify at least one first descriptor corresponding to the first application. For example, the application processor 901 may identify at least one first descriptor (e.g., IP version Handle(s): 0x01, 0x02, Traffic Descriptors: DNN_1, Route Selection Descriptors: NSSAI-a in Table 4) corresponding to the first application, and identify a first network interface (e.g., rmnet1_nsA in Table 4) corresponding to the descriptor.

According to various embodiments, the application processor 901 may, in operation 1117, provide the first descriptor and identification information of the first network interface corresponding to the first descriptor to the communication processor 902. In operation 1119, the communication processor 902 may establish a first data session, based on the first descriptor. For example, the communication processor 902 may establish the first data session, based on the first descriptor (e.g., IP version Handle(s): 0x01, 0x02, Traffic Descriptors: DNN_1, Route Selection Descriptors: NSSAI-a in Table 4). In addition, the communication processor 902 may associate the first data session with the first network interface (e.g., rmnet1_nsA).

According to various embodiments, the application processor 901 may, in operation 1121, transmit data via the first network interface corresponding to the first descriptor. In operation 1123, the communication processor 902 may transmit the data received via the first network interface, using the first data session.

Figure 12:
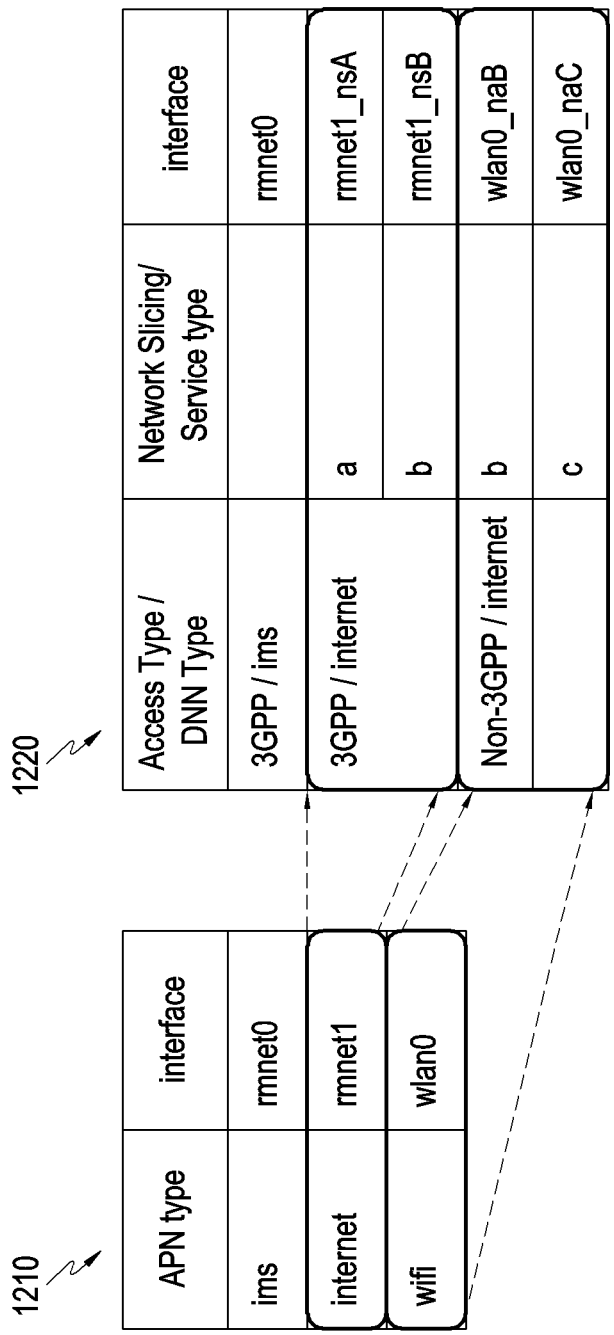
FIG. 12 is a diagram illustrating an example operation of configuring a network interface according to various embodiments.

FIG. 12 is a diagram illustrating an example operation of configuring a network interface according to various embodiments.

An electronic device according to a comparative example for comparison with various embodiments may configure association information 1210 between an APN type and a network interface. In the association information 1210, network interfaces (rmnet0, rmnet 1, and wlan0) may be mapped to and configured for respective APNs (ims, internet, and WiFi). In the comparative example, APNs and network interfaces may be mapped to each other in one-to-one correspondence.

The electronic device 101 according to various embodiments may configure association information 1220 between a network interface and a descriptor (e.g., an access type, a DNN type, and network slicing/a service type). According to various embodiments, descriptors and network interfaces may be mapped to each other in one-to-one correspondence. In addition, the electronic device 101 according to various embodiments may map, to a network interface, a descriptor for an access type of non-3GPP (e.g., WiFi) as well as a descriptor for an access type of 3GPP. Network slicing may also be applied to even the non-3GPP access type. The electronic device 101 may configure network slice b and network slice c for an Internet DNN of non-3GPP. The electronic device 101 may associate a network interface of wlan0_naB with network slice b of an Internet DNN of non-3GPP, and associate a network interface of wlan0_naC with network slice c of an Internet DNN of non-3GPP. According to the above description, where multiple network slices are configured for one DNN, the electronic device 101 may associate the multiple network interfaces with multiple network slices.

According to various embodiments, the electronic device 101 may also configure an identifier of a network slice, based on information of a descriptor. In one example, the electronic device 101 may configure an identifier of a network interface in a form of "rmnet #(DNN identification information) #' (network slice identification information)". The DNN identification information may be represented by 0 in a case of ims and 1 in a case of internet, but this merely corresponds to an example. For example, with reference to the association information 1220, an identifier of a network interface corresponding to network slice a for an Internet DNN of a 3GPP access type may be rmnet1_nsA. In rmnet1_nsA, "1" may be, for example, identification information of an Internet DNN, and "nsA" may be identification information of network slice a. According to an identifier generation scheme as described above, an identifier of a network interface corresponding to network slice b for an Internet DNN of a 3GPP access type may be rmnet1_nsB.

Figure 13:
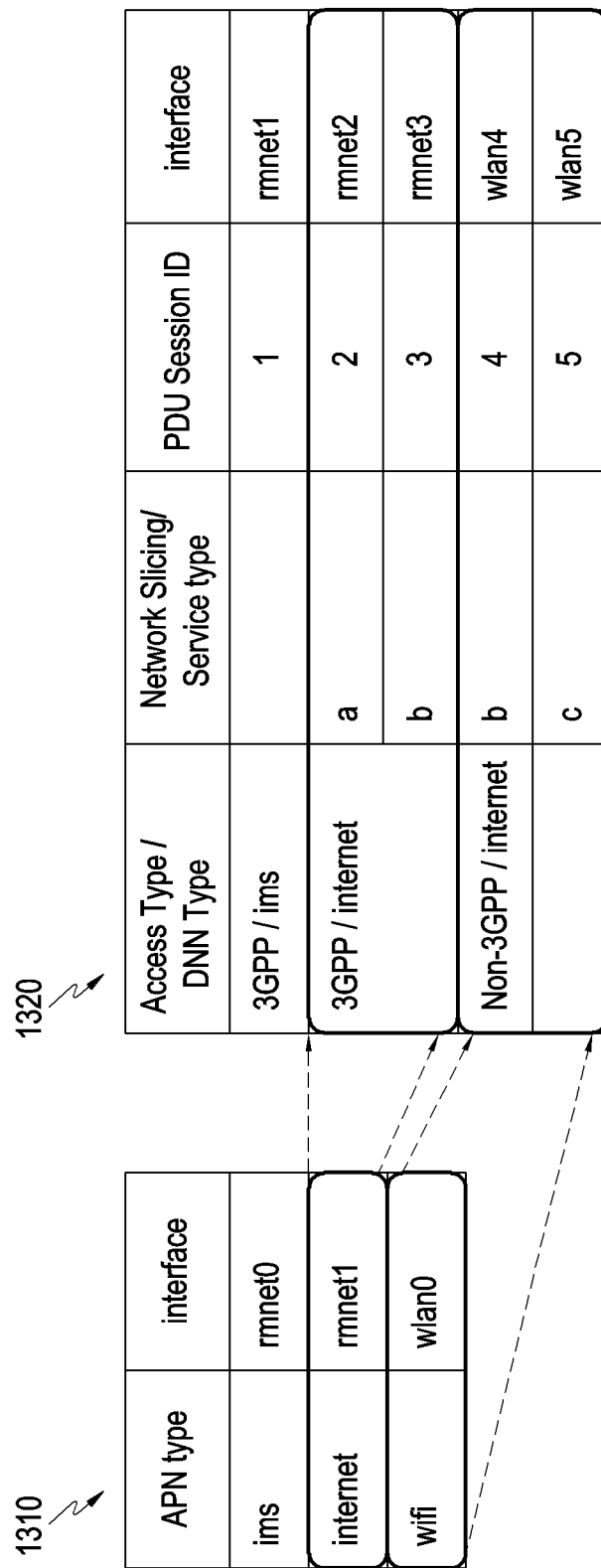
FIG. 13 is a diagram illustrating an example operation of configuring a network interface according to various embodiments.

FIG. 13 is a diagram illustrating an example operation of configuring a network interface according to various embodiments.

An electronic device according to a comparative example for comparison with various embodiments may configure association information 1310 between an APN type and a network interface. In the association information 1310, network interfaces (rmnet0, rmnet 1, and wlan0) may be mapped to and configured for respective APNs (ims, Internet, and WiFi). In the comparative example, APNs and network interfaces may be mapped to each other in one-to-one correspondence.

The electronic device 101 according to various embodiments may configure association information 1320 between a network interface and a descriptor (e.g., an access type, a DNN type, network slicing/a service type, and a PDU session identifier (ID)). The electronic device 101 may generate an identifier of a network interface, based on an identifier of a data session (e.g., a PDU session). For example, where the electronic device 101 includes, in a descriptor, even a FQDN or SSC MODE in addition to a DNN and NSSAI, when identification information for all factors is reflected on an identifier of a network interface, the identifier of the network interface may be configured to be relatively long. The electronic device 101 may configure a PDU session identifier for each descriptor, and configure an identifier of a network interface, based on the PDU session identifier. Referring to the association information 1320, it may be identified that each identifier of network identifiers includes the number of a PDU session identifier after rment. A PDU session identifier in the association information 1320 may be different from a PDU session identifier assigned by a network, but may be the same according to the implementation.

Figure 14:
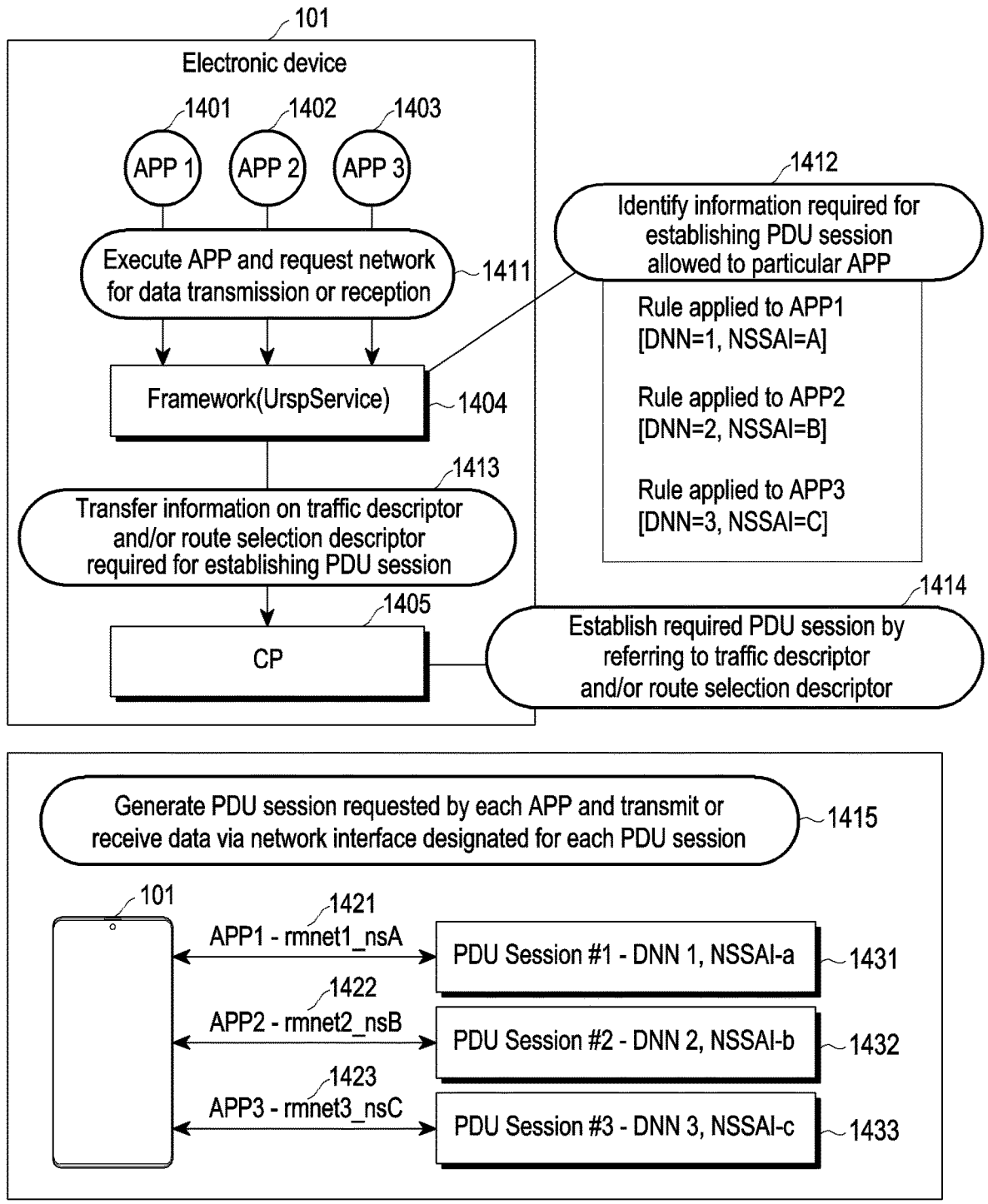
FIG. 14 is a diagram illustrating an example operation where multiple applications of an electronic device use different DNNs and different NSSAIs according to various embodiments.

FIG. 14 is a diagram illustrating an example operation where multiple applications of an electronic device use different DNNs and different NSSAIs according to various embodiments.

According to various embodiments, the electronic device 101 may execute a first application 1401, a second application 1402, and a third application 1403. In operation 1411, the first application 1401, the second application 1402, and the third application 1403 may be executed and request a network for data transmission or reception from a framework 1404 (e.g., UrspService). The framework 1404 may, in operation 1412, identify information required for establishing a PDU session allowed to a particular application. For example, the electronic device 101 may identify that a rule applied to the first application 1401 is DNN=1 and NSSAI=A, a rule applied to the second application 1402 is DNN=2 and NSSAI=B, and a rule applied to the third application 1403 is DNN=3 and NSSAI=C. A communication processor 1405 may receive association information between a network interface and a rule applied to each application in advance, and store same.

According to various embodiments, the framework 1404 may, in operation 1413, transfer information on a traffic descriptor and/or a route selection descriptor required for establishing a PDU session to the communication processor 1405. The communication processor 1405 may, in operation 1414, may establish a required PDU session by referring to the traffic descriptor and/or the route selection descriptor. For example, the communication processor 1405 may establish a first PDU session (PDU Session #1) 1431, based on a descriptor of DNN 1 and NAASI-a, establish a second PDU session (PDU Session #2) 1432, based on a descriptor of DNN 2 and NAASI-b, and establish a third PDU session (PDU Session #3) 1433, based on a descriptor of DNN 3 and NAASI-c. The communication processor 1405 of the electronic device 101 may, based on pre-stored association information, associate the first PDU session 1431 with a first network interface (rmnet1_nsA) 1421, associate the session PDU session 1432 with a second network interface (rmnet2_nsB), and associate the third PDU session 1433 with a third network interface (rmnet3_nsC).

According to various embodiments, the communication processor 1405 may, in operation 1415, transmit or receive data via a network interface designated for each PDU session. For example, an application processor (not illustrated) may transmit or receive data associated with the first application 1401 via the first network interface (rmnet1_nsA) 1421, and the communication processor 1405 may transmit or receive data to or from the first PDU session 1431 via the first network interface (rmnet1_nsA) 1421. For example, an application processor (not illustrated) may transmit or receive data associated with the second application 1402 via the second network interface (rmnet2_nsB) 1422, and the communication processor 1405 may transmit or receive data to or from the second PDU session 1432 via the second network interface (rmnet2_nsB) 1422. For example, an application processor (not illustrated) may transmit or receive data associated with the third application 1403 via the third network interface (rmnet3_nsC) 1423, and the communication processor 1405 may transmit or receive data to or from the third PDU session 1433 via the third network interface (rmnet3_nsC) 1423.

Figure 15:
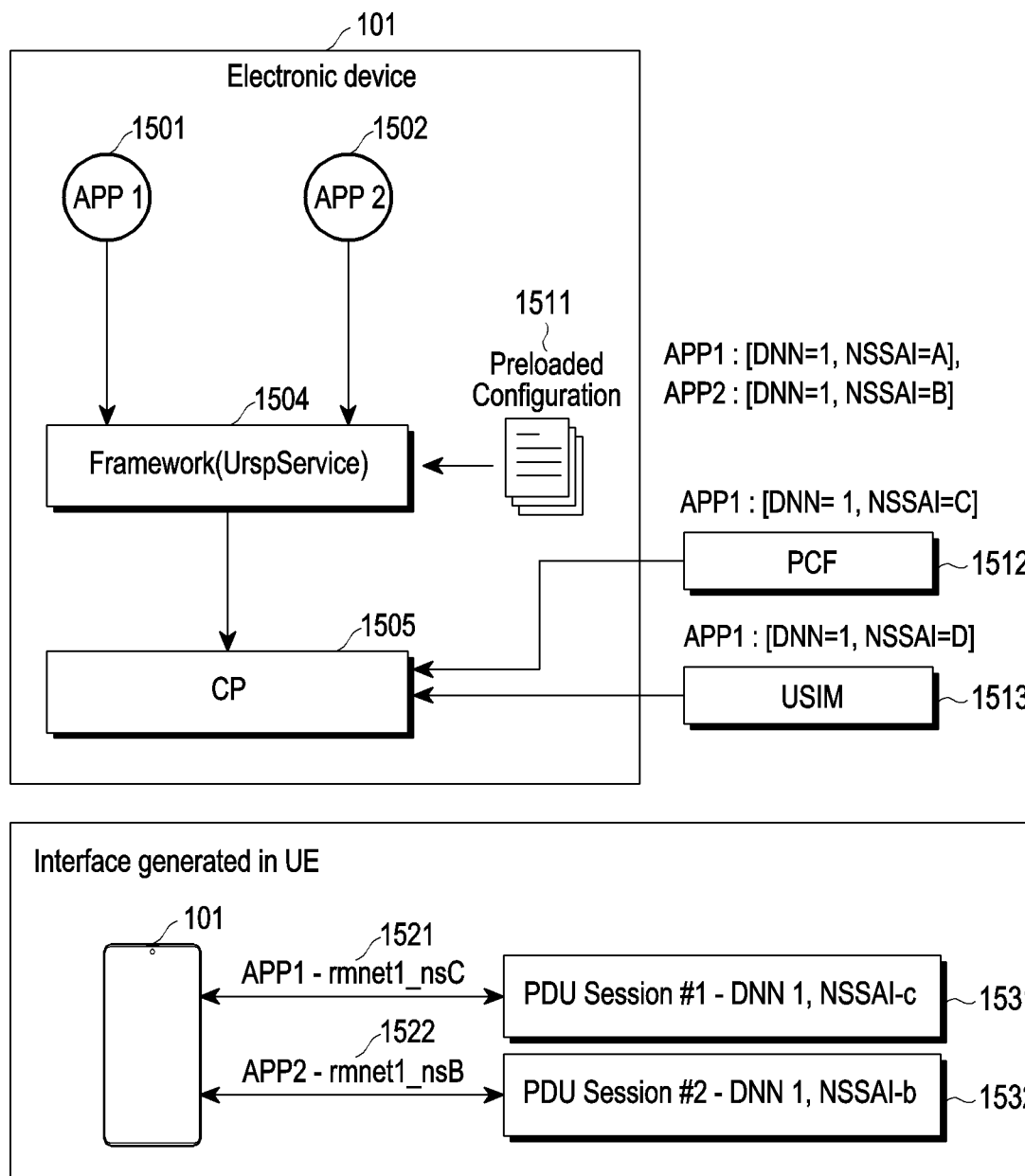
FIG. 15 is a diagram illustrating an example operation where multiple applications of an electronic device use the same DNN and different NSSAIs according to various embodiments.

FIG. 15 is a diagram illustrating an example operation where multiple applications of an electronic device use the same DNN and different NSSAIs according to various embodiments.

According to various embodiments, the electronic device 101 may execute a first application 1501 and a second application 1502. A framework 1504 (e.g., UrspService) may select one among a pre-loaded configuration 1511, a rule received from a PCF 1512, and a rule received from a USIM 1513. For example, the pre-loaded configuration 1511 may indicate DNN=1 and NSSAI=A for the first application 1501, and indicate DNN=1 and NSSAI=B for the second application 1502. For example, the rule configured by the PCF 1512 may indicate DNN=1 and NSSAI=C for the first application 1501. For example, the rule configured by the USIM 1513 may indicate DNN=1 and NSSAI=D for the first application 1501. The framework 1504 may identify existence of multiple rules for the first application 1501, and may select a rule to be applied to the first application 1501 among the multiple rules. For example, the framework 1504 may select the rule of DNN=1 and NSSAI=C, which is configured by the PCF 1512, for the first application 1501, based on the priority of the rule configured by the PCF 1512 being higher than those of the remaining rules. For the second application 1502, the rule of DNN=1 and NSSAI=B exists in the pre-loaded configuration 1511, and the framework 1504 may determine the rule as a rule to be applied to the second application 1502. As described above, the first application 1501 and the second application 1502 may be configured to use different network slices while using the same DNN.

According to various embodiments, the framework 1504 may transfer information on a traffic descriptor and/or a route selection descriptor required for establishing a PDU session to a communication processor 1505. The communication processor 1505 may establish a required PDU session by referring to the traffic descriptor and/or the route selection descriptor. For example, the communication processor 1505 may establish a first PDU session (PDU Session #1) 1531, based on a descriptor of DNN 1 and NAASI-c, and establish a second PDU session (PDU Session #2) 1532, based on a descriptor of DNN 1 and NAASI-b. The communication processor 1505 of the electronic device 101 may, based on pre-stored association information, associate the first PDU session 1531 with a first network interface (rmnet1_nsC) 1521, and associate the session PDU session 1532 with a second network interface (rmnet1_nsB) 1522.

According to various embodiments, the communication processor 1505 may, in operation 1415, transmit or receive data via a network interface designated for each PDU session. For example, an application processor (not illustrated) may transmit or receive data associated with the first application 1501 via the first network interface (rmnet1_nsC), and the communication processor 1505 may transmit or receive data to or from the first PDU session 1531 via the first network interface (rmnet1_nsC) 1521. For example, an application processor (not illustrated) may transmit or receive data associated with the second application 1502 via the second network interface (rmnet1_nsB) 1522, and the communication processor 1505 may transmit or receive data to or from the second PDU session 1532 via the second network interface (rmnet1_nsB) 1522.

Figure 16:
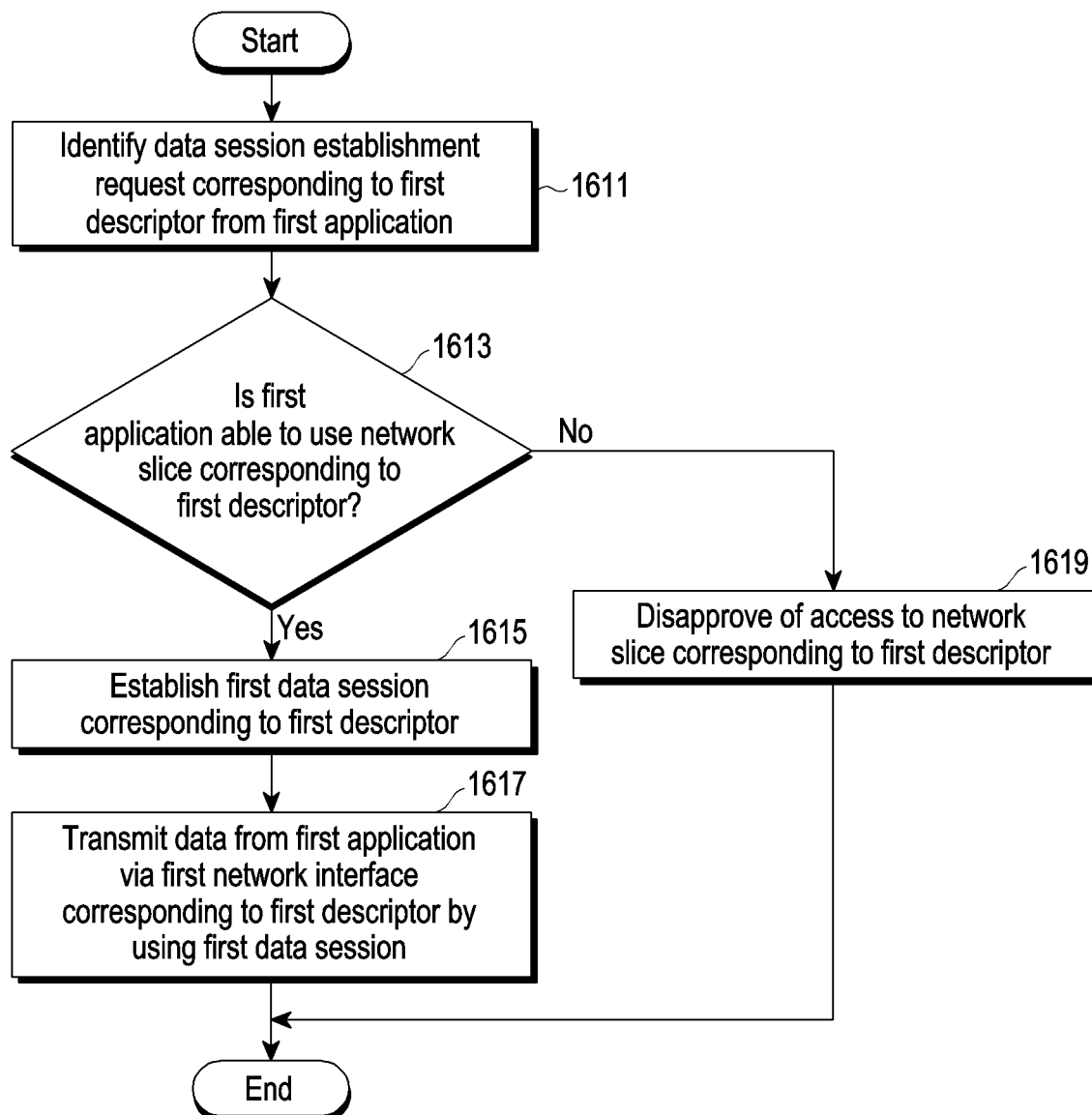
FIG. 16 is a flowchart illustrating an example method of operating an electronic device according to various embodiments.
Figure 17:
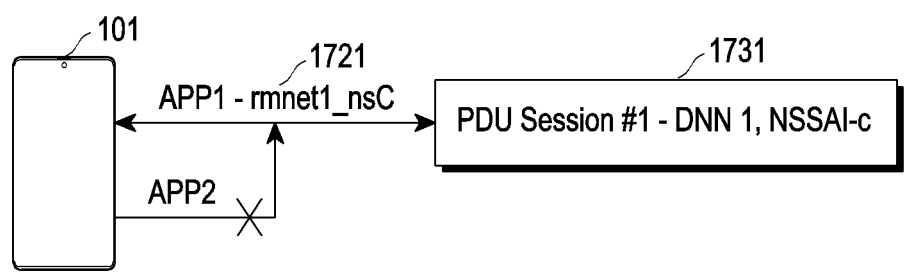
FIG. 17 is a diagram illustrating an example operation of preventing a usage request of an application according to various embodiments.

FIG. 16 is a flowchart illustrating an example method of operating an electronic device according to various embodiments. FIG. 16 will be described with reference to FIG. 17. FIG. 17 is a diagram illustrating an example operation of preventing a usage request of an application according to various embodiments.

According to various embodiments, the electronic device 101 may, in operation 1611, identify a data session establishment request corresponding to a first descriptor from a first application. For example, the first application may specify information of a data session to use, for example, the first descriptor while requesting establishment of a data session.

According to various embodiments, in operation 1613, the electronic device 101 may determine whether the first application is able to use a network slice corresponding to the first descriptor.

In various embodiments, where the first application is a normal application, the electronic device 101 may determine that the first application is able to use a network slice corresponding to the first descriptor. Where the first application is an abnormal application, the electronic device 101 may determine that the first application is unable to use a network slice corresponding to the first descriptor. For example, the electronic device 101 may determine whether the first application is normal, based on a route according to which the first application is installed. Based on whether the first application is installed via a pre-designated app store, and/or whether the first application is installed by a backup tool, the electronic device may determine whether the first application is normal. For example, the electronic device 101 may determine whether the first application is normal, based on a signature of the first application. Only an application having a designated signature may be allowed to use a designated network slice. For example, the electronic device 101 may determine whether the first application is normal, based on a md5 checksum value of an APK file of the first application. At a time point of application installation or a time point of initial execution, the electronic device 101 may calculate an md5 hash, and store the result of the calculation in an internal memory (e.g., the memory 130 in FIG. 1) of the electronic device 101 and/or an external memory together with application information (e.g., the name and/or version of a package). Therefore, the electronic device 101 may calculate a checksum value of md5, for example, at a time point of acquisition of a network usage request, for example, a data session establishment request from the application, and compare same with the stored calculation result. The electronic device 101 may determine whether the first application is normal, based on a result of comparison.

In various embodiments, the electronic device 101 may determine whether the first application is able to use a network slice corresponding to the first descriptor, based on whether the first application has an authority to use the network slice corresponding to the first descriptor. As described above, the electronic device 101 may identify in advance information on a descriptor for each application, based on at least one rule, and manage same. The electronic device 101 may determine, based on the managed information, whether the first application is able to use a network slice corresponding to the first descriptor. Determination on whether the first application is able to use same may also be performed by, for example, UrspService.

According to various embodiments, when it is identified or determined that the first application is able to use a network slice corresponding to the first descriptor (operation 1613-yes), the electronic device 101 may, in operation 1615, establish a first data session corresponding to the first descriptor. In operation 1617, the electronic device 101 may transmit data from the first application via a first network interface corresponding to the first descriptor by using the first data session. When it is identified that the first application is unable to use a network slice corresponding to the first descriptor (operation 1613-no), the electronic device 101 may, in operation 1619, disapprove of access to a network slice corresponding to the first descriptor. For example, as in FIG. 17, the electronic device 101 may configure a first descriptor (e.g., DNN1 and NSSAI-c) for a first application. The electronic device 101 may determine whether the first application has an authority to use the first descriptor, in response to a data session establishment request for the first descriptor from the first application. When it is determined that the first application has an authority to use the first descriptor, the electronic device 101 may establish a first data session (PDU session #1) 1731. The electronic device 101 may transmit or receive data associated with the first application to or from the first data session 1731 via a first network interface (rmnet1_nsC) 1721. Meanwhile, a second application may also request establishment of a data session for the first descriptor. The electronic device 101 may determine that the second application is unable to use a data session for the first descriptor. Accordingly, the electronic device may prevent the second application from using the first data session 1731. For example, the electronic device 101 may identify that a rule applied to the second application is a second descriptor (e.g., DNN=2 and NSSAI=B), thereby identifying that there is no usage authority for the first descriptor. For example, the electronic device 101 may determine whether the second application has a usage authority, based on a result of comparison between the precedence of a rule applied to the first application and the precedence of a rule applied to the second application. Also in a case where it is determined that the second application is an abnormal application, the electronic device 101 may disapprove of the second application using a data session for the second descriptor.

Figure 18A:
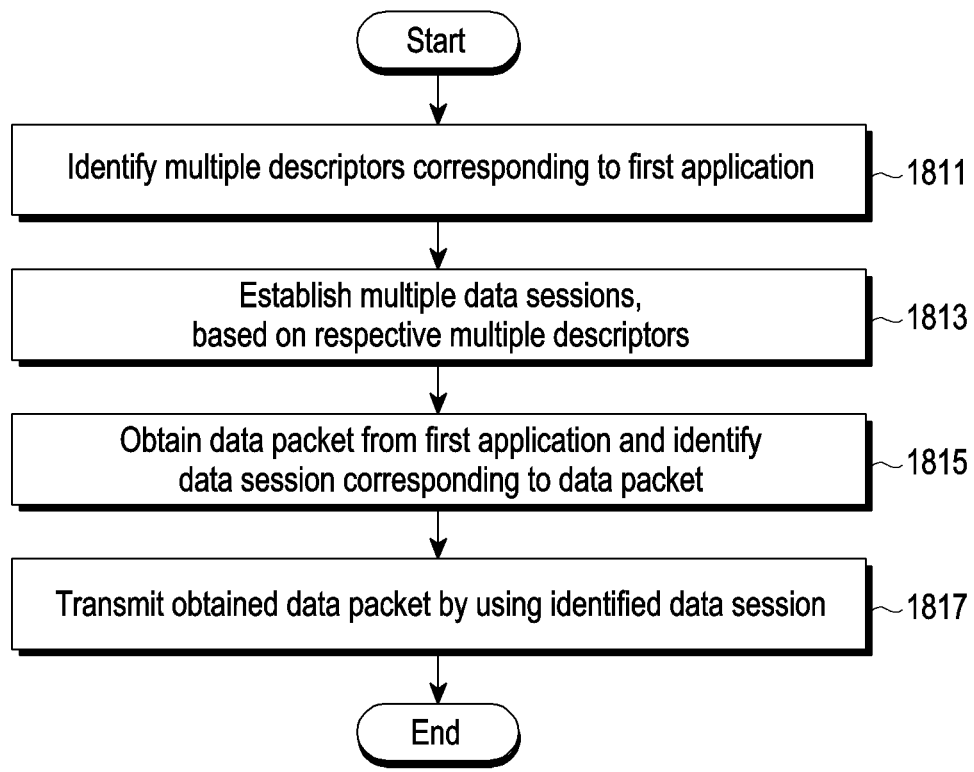
FIG. 18A is a flowchart illustrating an example method of operating an electronic device according to various embodiments.
Figure 18B:
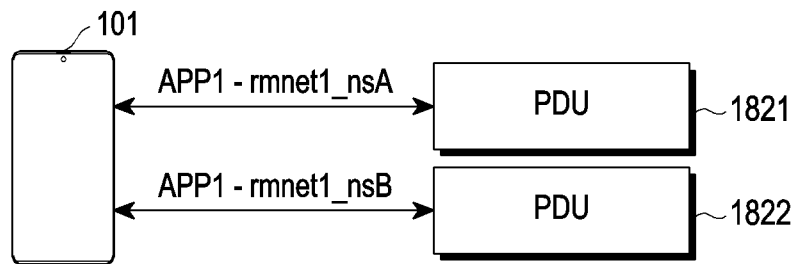
FIG. 18B is a diagram illustrating an example operation of using multiple network slices by one application according to various embodiments.

FIG. 18A is a flowchart illustrating an example method of operating an electronic device according to various embodiments. FIG. 18A will be described with reference to FIG. 18B. FIG. 18B is a diagram illustrating an example operation of using multiple network slices by one application according to various embodiments.

According to various embodiments, the electronic device 101 may, in operation 1811, identify multiple descriptors corresponding to a first application. The first application may support multiple descriptors. In one example, the first application may be configured to transmit or receive data via a first network slice for security at the time of an account login, and transmit or receive data via a second network slice for URLLC after the account login. The electronic device 101 may map a first descriptor for the first network slice and a second descriptor for the second network slice to correspond to the first application, and manage same.

According to various embodiments, the electronic device 101 may, in operation 1813, establish multiple data sessions, based on the respective multiple descriptors. For example, the first application may identify information on available descriptors by using an API of getUrspRule. The first application may specify a descriptor to use and request establish of a data session, and the electronic device 101 may establish a data session corresponding to the descriptor, based on the request. The electronic device 101 may at least simultaneously establish multiple data sessions, or may terminate establishment of a data session while establishing same, and establish a different data session. The electronic device 101 may, in operation 1815, obtain a data (e.g., an IP) packet from the first application and identify a data session corresponding to the IP packet. The electronic device 101 may, in operation 1817, transmit the obtained IP packet using the identified data session. The electronic device 101 may, for example, route a generated IP packet to a network slice corresponding to a data session corresponding to a traffic descriptor.

Referring to FIG. 18B, the electronic device 101 may establish a first data session 1821 and a second data session 1822. Data may be transmitted or received via multiple network interfaces (rmnet1_nsA and rmnet1_nsB) for one application. The electronic device 101 may transmit or receive data to or from the first data session 1821 and the second data session 1822 via the respective multiple network interfaces (rmnet1_nsA and rmnet1_nsB).

Figure 19:
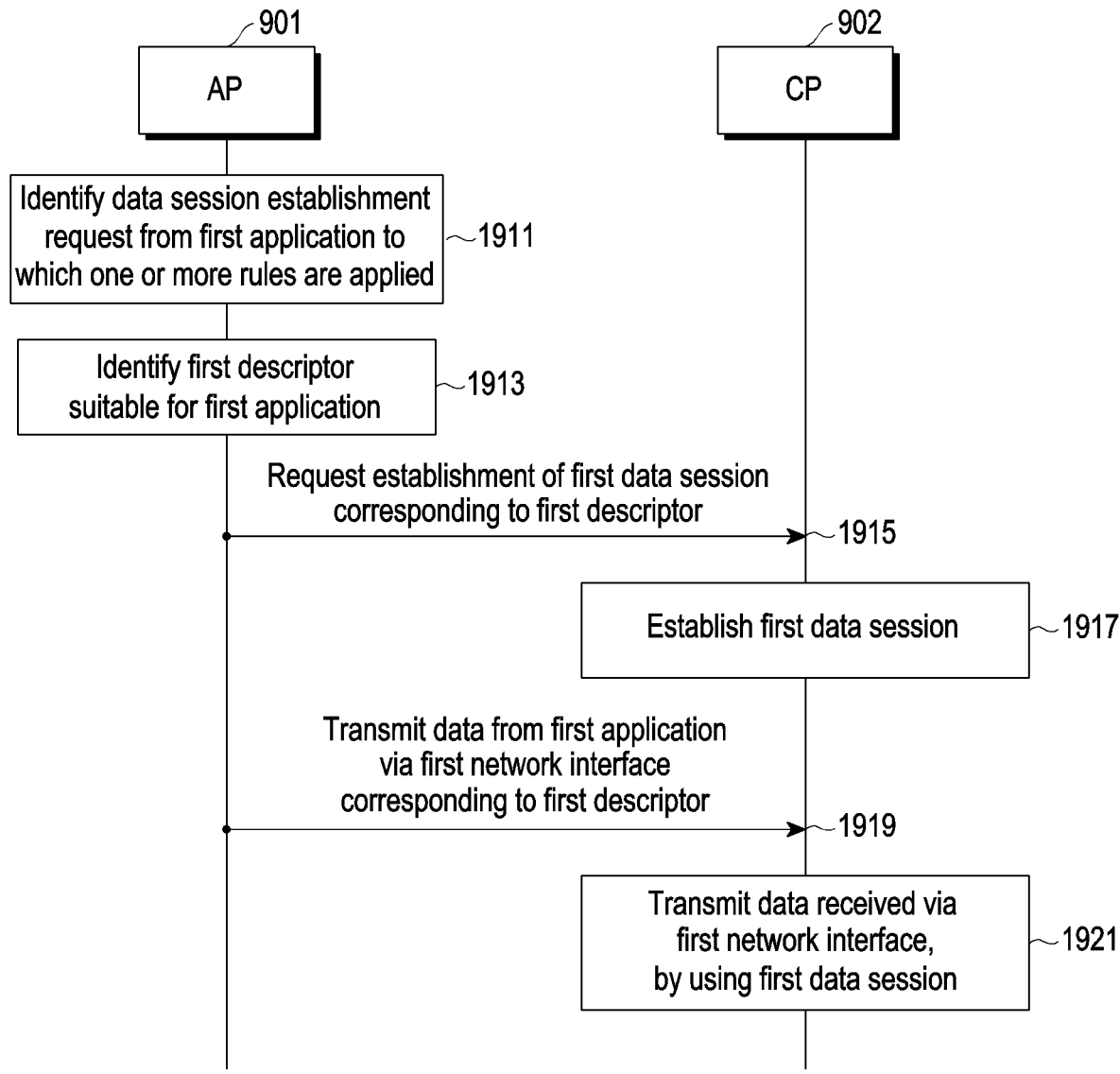
FIG. 19 is a signal flow diagram illustrating an example method of operating an electronic device according to various embodiments.

FIG. 19 is a signal flow diagram illustrating an example method of operating an electronic device according to various embodiments.

According to various embodiments, the application processor 901 may, in operation 1911, identify a data session establishment request from a first application to which one or more rules are applied. For example, the electronic device 101 may apply a first rule (DNN=1, NSSAI=C, and Precedence=1) and a second rule (DNN=1, NSSAI=B, and Precedence=2) to the first application. The first application may not specify a network slice (or descriptor) to use.

According to various embodiments, the application processor 901 may, in operation 1913, identify a first descriptor suitable for the first application. For example, the application processor 901 may select the first descriptor, based on the precedence in a rule, but there is no limit to a scheme of identifying a suitable descriptor. The application processor 901 may, in operation 1915, request the communication processor 902 to establish a first data session corresponding to the first descriptor. In operation 1917, the communication processor 902 may establish the first data session. In operation 1919, the application processor 901 may transmit data from the first application, to the communication processor 902 via a first network interface corresponding to the first descriptor. In operation 1921, the communication processor 902 may transmit the data received via the first network interface, using the first data session. For example, the communication processor 902 may perform communication via a network slice of NSSAI=C.

Figure 20:
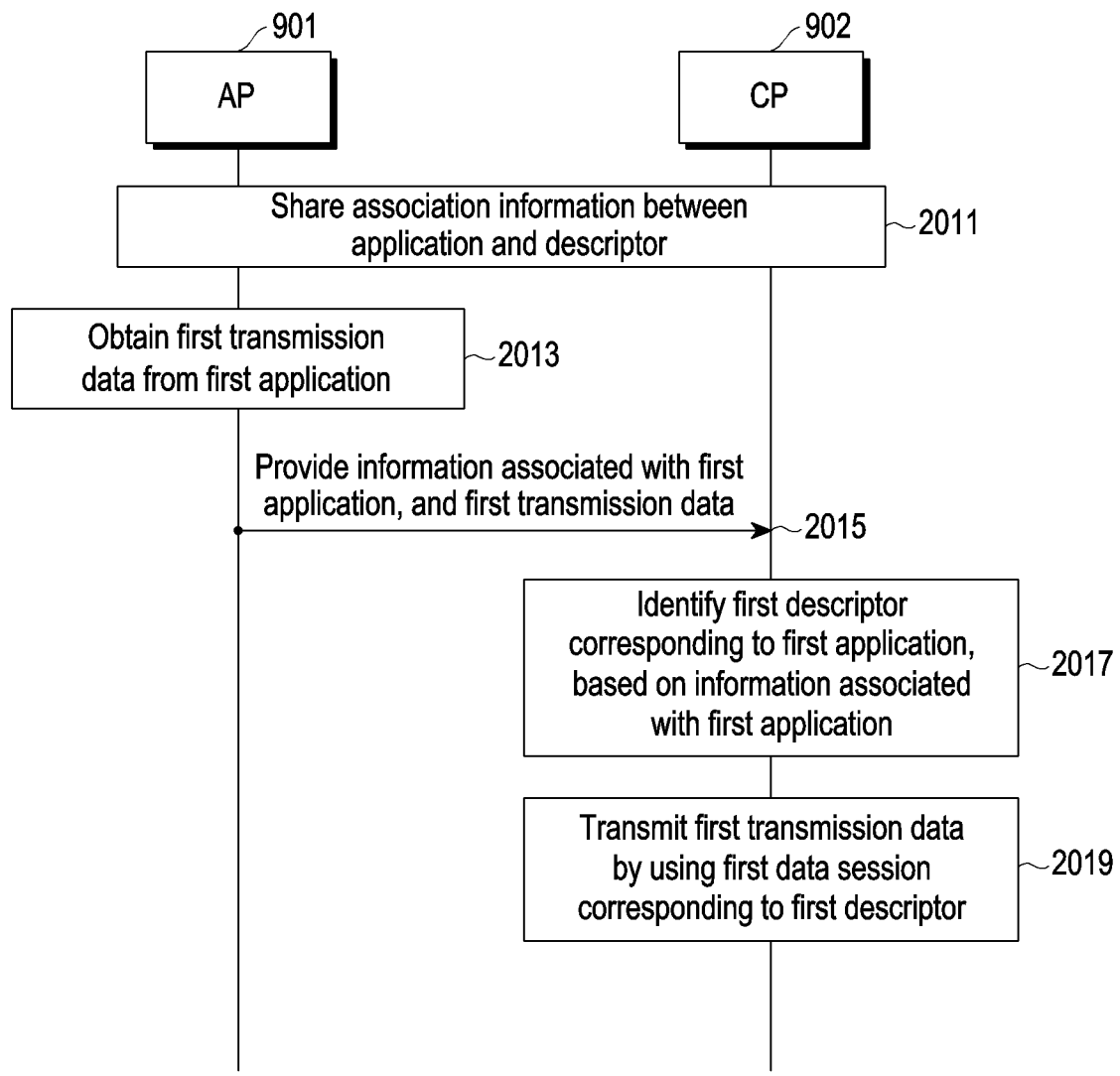
FIG. 20 is a signal flow diagram illustrating an example method of operating an electronic device according to various embodiments.
Figure 21A:
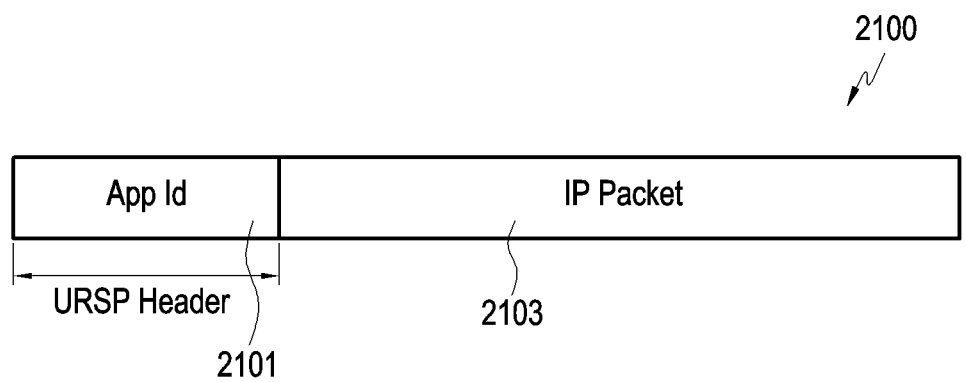
FIG. 21A is a diagram illustrating an example structure of data transferred from an application processor to a communication processor according to various embodiments.

FIG. 20 is a signal flow diagram illustrating an example method of operating an electronic device according to various embodiments. FIG. 20 will be described with reference to FIG. 21A. FIG. 21A is a diagram illustrating an example structure of data transferred from an application processor to a communication processor according to various embodiments.

According to various embodiments, the application processor 901 may, in operation 2011, share association information between an application and a descriptor with the communication processor 902. The application processor 901 may, in operation 2013, obtain first transmission data from a first application. In operation 2015, the application processor 901 may provide information associated with the first application, and the first transmission data to the communication processor 902. For example, the application processor 901 may provide data 2100 as shown in FIG. 21A to the communication processor 902. The data 2100 according to various embodiments may include application identification information 2101 and an IP packet 2103. The application identification information 2101 may be, for example, information indicating an application having generated the IP packet 2103, and there is no limit to the representation form thereof.

According to various embodiments, the communication processor 902 may, in operation 2017, identify a first descriptor corresponding to the first application, based on the information associated with the first application. For example, the communication processor 902 may identify the application identification information 2101 of the received data 2100. The communication processor 902 may identify a descriptor corresponding to the application identification information 2101, based on pre-shared association information between an application and a descriptor.

According to various embodiments, the communication processor 902 may, in operation 2019, transmit the first transmission data using a first data session corresponding to the first descriptor. The communication processor 902 may transmit only the part of the IP packet 2103 in the received data 2100 by using the first data session.

In the above scheme, the application processor 901 may configure, for example, one network interface per each DNN. The application processor 901 may transfer application identification information to the communication processor 902 so as to allow the communication processor 902 to identify a data session to use for transmission of the data even though the application processor has transmitted the data via one network interface. The application processor 901 may, for example, notify the communication processor 902 of whether to provide the application identification information 2101, and the communication processor 902 may process the application identification information 2101, based on the corresponding information.

In an embodiment, the application processor 901 may include a descriptor together with the IP packet 2103 and transfer same to the communication processor 902. The communication processor 902 may identify a data session, based on the received descriptor. The communication processor 902 may transmit the IP packet 2103 by using the identified data session. The communication processor 902 may transmit the IP packet 2103 even without association information between an application and a descriptor.

Figure 21B:
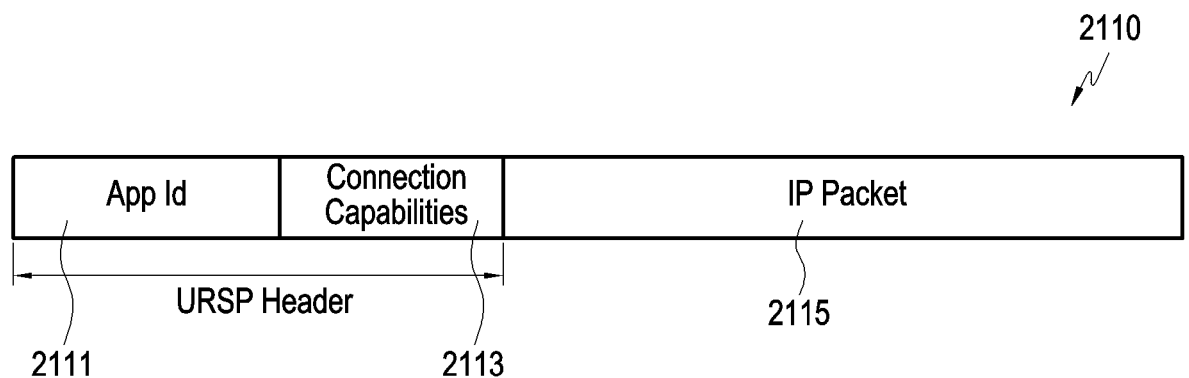
FIG. 21B is a diagram illustrating an example structure of data transferred from an application processor to a communication processor according to various embodiments.

FIG. 21B is a diagram illustrating an example structure of data transferred from an application processor to a communication processor according to various embodiments.

According to various embodiments, the application processor 901 may provide data 2110 to the communication processor 902. The data 2110 according to various embodiments may include application identification information 2111, connection capabilities 2113, and an IP packet 2115. The connection capabilities may be represented by one octet sequence, and for example, "0000001" may imply that a traffic descriptor is IMS, "00000010" may imply that a traffic descriptor is MMS, "0000100" may imply that a traffic descriptor is SUPL, and "00001000" may imply that a traffic descriptor is Internet. The communication processor 902 may identify a data session by using the received application identification information 2111 and connection capabilities 2113 together.

Figure 21C:
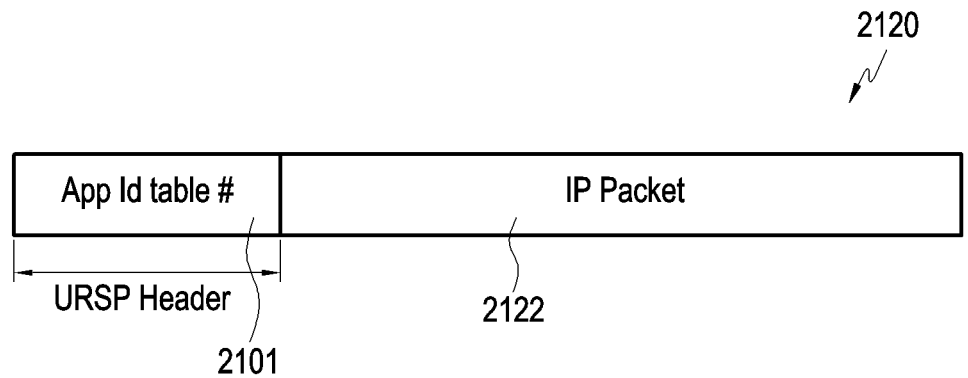
FIG. 21C is a diagram illustrating an example structure of data transferred from an application processor to a communication processor according to various embodiments.

FIG. 21C is a diagram illustrating an example structure of data transferred from an application processor to a communication processor according to various embodiments.

According to various embodiments, the application processor 901 may provide data 2120 to the communication processor 902. The data 2120 according to various embodiments may include the number 2101 of an application identification information table and an IP packet 2122. For example, the application processor 901 and the communication processor 902 may share a table as Table 6.

TABLE 6

| Application identification information table number | Application identifier |
|---|---|
| 0 | Reserved |
| 1 | Com.google.android.youtube |
| 2 | Com.snapchat.android |
| 3 | Com.netflix.mediaclient |
| ... | ... |
| 255 (0XFF) | Com.samsung.android.bixby.service |

Figure 21D:
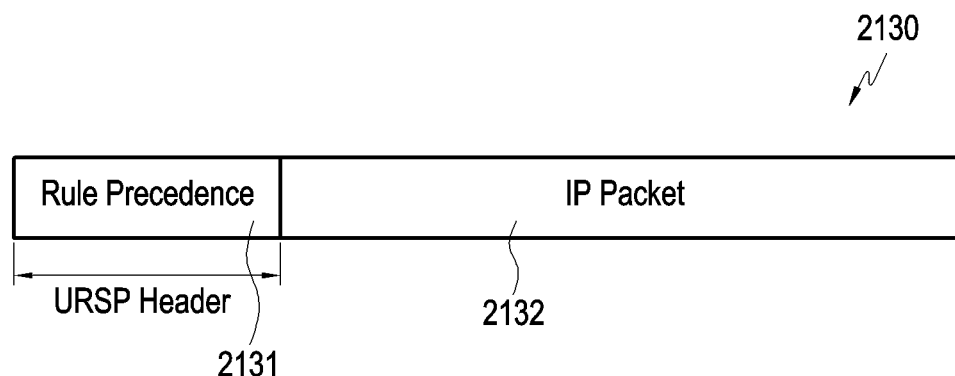
FIG. 21D is a diagram illustrating an example structure of data transferred from an application processor to a communication processor according to various embodiments.

A table number having a relatively small data size is included in the number 2101 of the application identification information table. Therefore, the data 2120 transferred from the application processor 901 to the communication processor 902 may be maintained at a small size. FIG. 21D is a diagram illustrating an example structure of data transferred from an application processor to a communication processor according to various embodiments.

According to various embodiments, the application processor 901 may provide data 2130 to the communication processor 902. The data 2130 according to various embodiments may include a rule precedence 2131 and an IP packet 2132. The communication processor 902 may share in advance a rule precedence and descriptor information corresponding thereto with the application 901. The communication processor 902 may identify the rule precedence 2131 of the received data 2130, and identify descriptor information corresponding to the rule precedence 2131. The communication processor 902 may transmit the IP packet 2132 by using a data session of a descriptor corresponding to the rule precedence 2131.

Figure 22A:
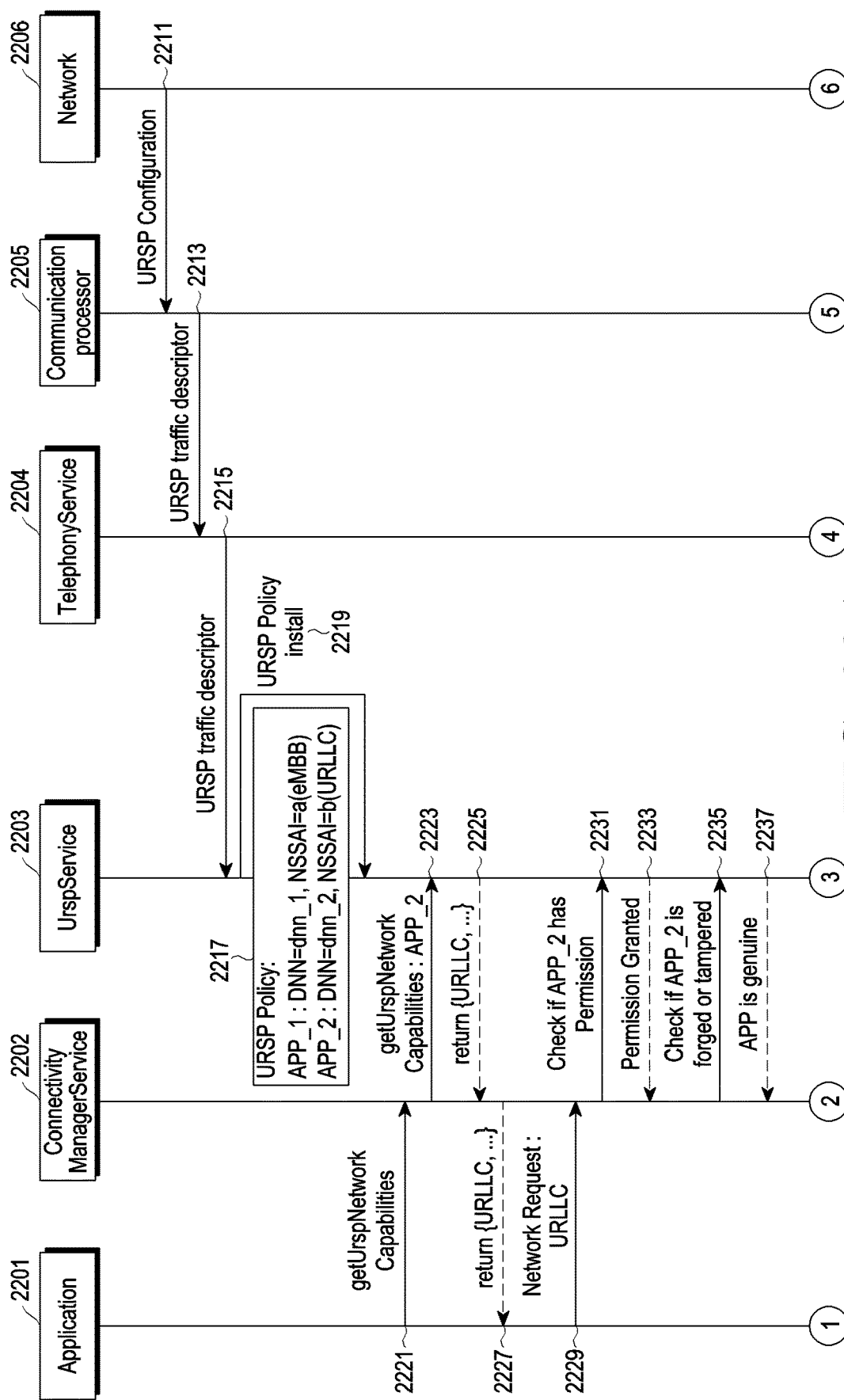
FIGS. 22A and 22B is a signal flow diagram illustrating an example method of operating an electronic device according to various embodiments.
Figure 22B:
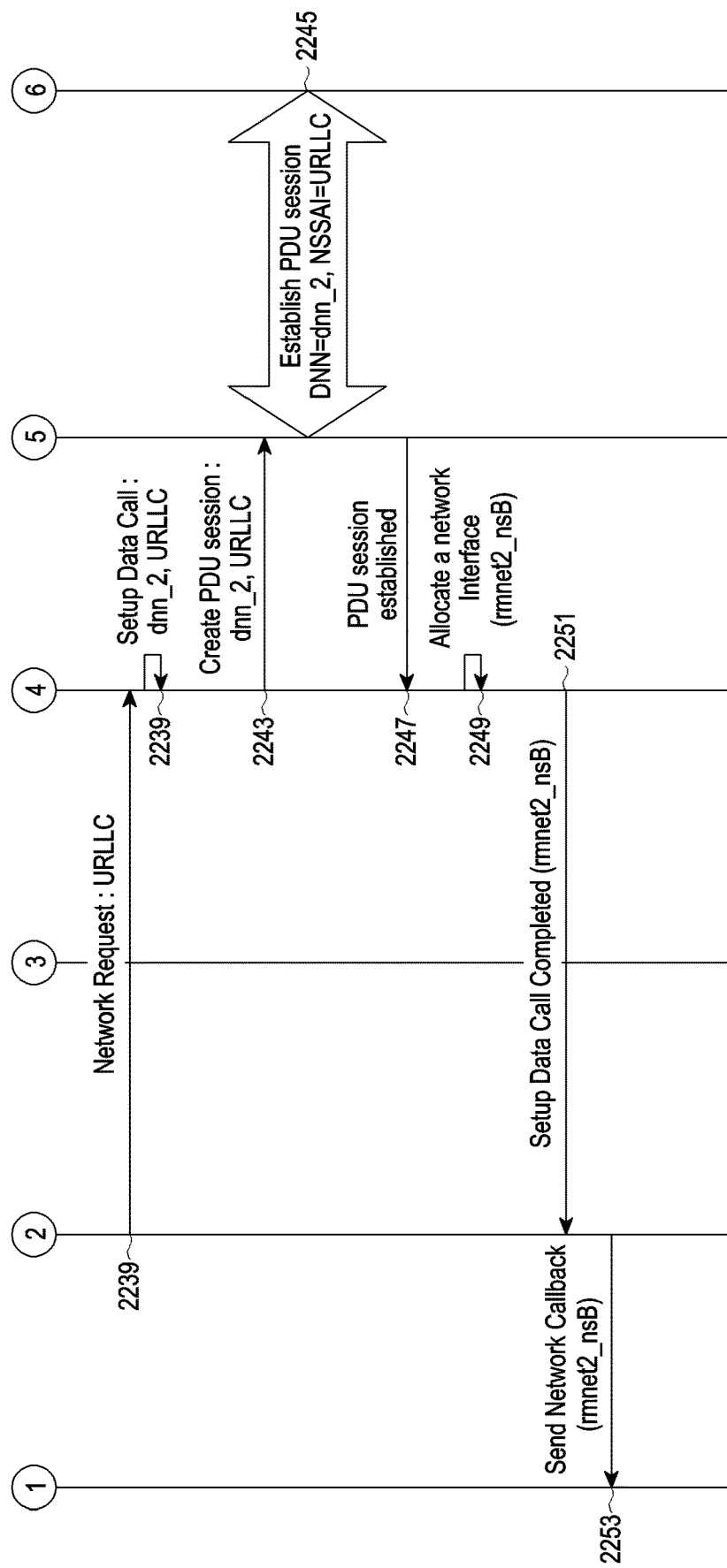

FIGS. 22A and 22B is a signal flow diagram illustrating an example method of operating an electronic device according to various embodiments.

According to various embodiments, a communication processor 2205 may, in operation 2211, receive a URSP configuration from a network 2206. The communication processor 2205 may, in operation 2213, provide a URSP traffic descriptor to Telephonyservice 2204, based on the received URSP configuration. Telephonyservice 2204 may, in operation 2215, provide the URSP traffic descriptor to UrspService 2203. According to various embodiments, Telephonyservice 2204 may receive a route selection descriptor as well as the traffic descriptor and transfer same to UrspService 2203. UrspService 2203 may, in operation 2219, store a URSP rule 2217. For example, the URSP rule 2217 may indicate that a first application (APP_1) corresponds to a first DNN (dnn_1) and a first network slice (NSSAI=a (eMBB)), and a second application (APP_2) corresponds to a second DNN (dnn_2) and a second network slice (NSSAI=b(URLLC)).

According to various embodiments, an application 2201 (e.g., the second application) may, in operation 2221, request getURSPnetworkCapabilities from ConnectivityManagerService 2202. getURSPnetworkCapabilities may correspond to a request for a URSP capability (e.g., information associated with a network slice) corresponding to an application. ConnectivityManagerService 2202 may, in operation 2223, transfer getURSPnetworkCapabilities to UrspService 2203. getURSPnetworkCapabilities may include information (e.g., an identifier (APP_2) of the second application) enabling identification of the application 2201. There is no limit to information enabling identification of the application 2201, and identification of the application 2201 may also be possible based on a combination of a traffic descriptor of a FQDN and/or IP tuple(s). In operation 2225, UrspService 2203 may return information (e.g., URLLC) of a network slice corresponding to the second application. ConnectivityManagerService 2202 may, in operation 2227, transfer the received slice information (e.g., URLLC) to the application 2201.

According to various embodiments, in operation 2229, the application 2201 may transfer a network request (e.g., a PDU session establishment request) to ConnectivityManagerService 2202. ConnectivityManagerService 2202 may, in operation 2231, request UrspService 2203 to check whether the second application (APP_2) has a permission. UrspService 2203 may identify, for example, that the second application (APP_2) has a permission, and may, in operation 2233, provide information indicating the permission being granted (permission granted) to ConnectivityManagerService 2202. In operation 2235, ConnectivityManagerService 2202 may request UrspService 2203 to check whether the second application (APP_2) is forged or tampered. UrspService 2203 may identify whether the second application (APP_2) is forged or tampered, according to the scheme described above. In operation 2237, UrspService 2203 may provide, to ConnectivityManagerService 2202, information indicating that the second application (APP_2) is genuine.

According to various embodiments, ConnectivityManagerService 2202, in operation 2339, transfer a network request (e.g., PDU session establishment request) to TelephonyService 2204, based on identification of the second application (APP_2) being genuine. The network request may include information (e.g., URLLC) on a network slice.

TelephonyService 2204 may, in operation 2241, set up a data call, based on the received network request. The data call may correspond to, for example, the second DNN (dnn_2) and the second network slice (URLLC). TelephonyService 2204 may, in operation 2243, request the communication processor 2205 to create a PDU session corresponding to the second DNN (dnn_2) and the second network slice (URLLC). In operation 2245, the communication processor 2205 may perform an operation for establishment of a PDU session corresponding to the second DNN (dnn_2) and the second network slice (URLLC) with the network 2206. The communication processor 2205 may establish a PDU session corresponding to the second DNN (dnn_2) and the second network slice (URLLC) with the network 2206, and may, in operation 2247, transfer information indicating establishment of the PDU session to TelephonyService 2204. In operation 2249, TelephonyService 2204 may allocate a network interface (e.g., rmnet2_nsB) to a corresponding PDU and the application 2201. In operation 2251, TelephonyService 2204 may transfer information indicating completion of setup of the data call to ConnectivtyManagerService 2202. ConnectivtyManagerService 2202 may, in operation 2253, transfer information indicating completion of setup of the data call to the application 2201. The corresponding information may include information on the allocated network interface (e.g., rmnet2_nsB).

Figure 23A:
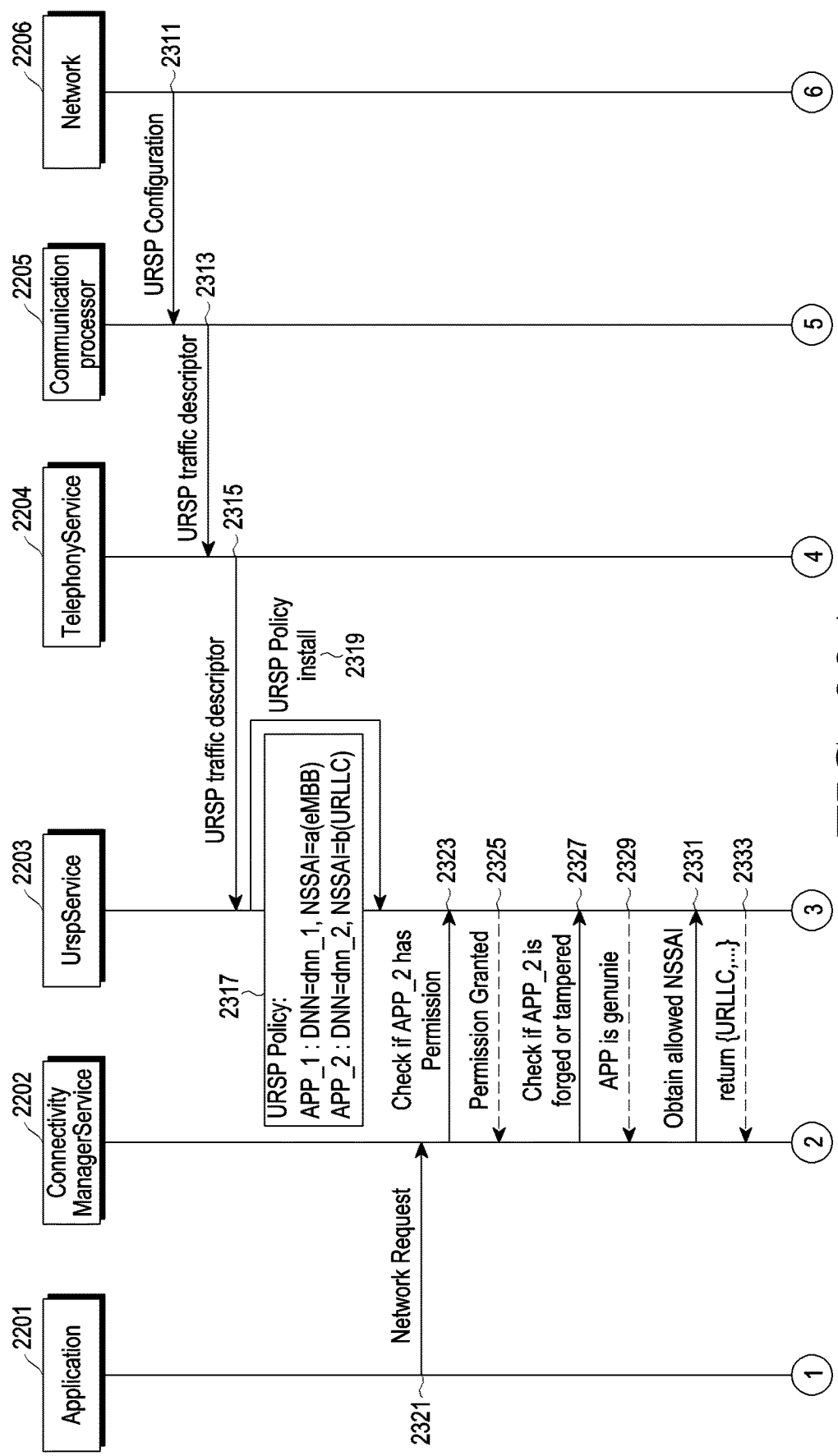
FIGS. 23A and 23B is a signal flow diagram illustrating an example method of operating an electronic device according to various embodiments.
Figure 23B:
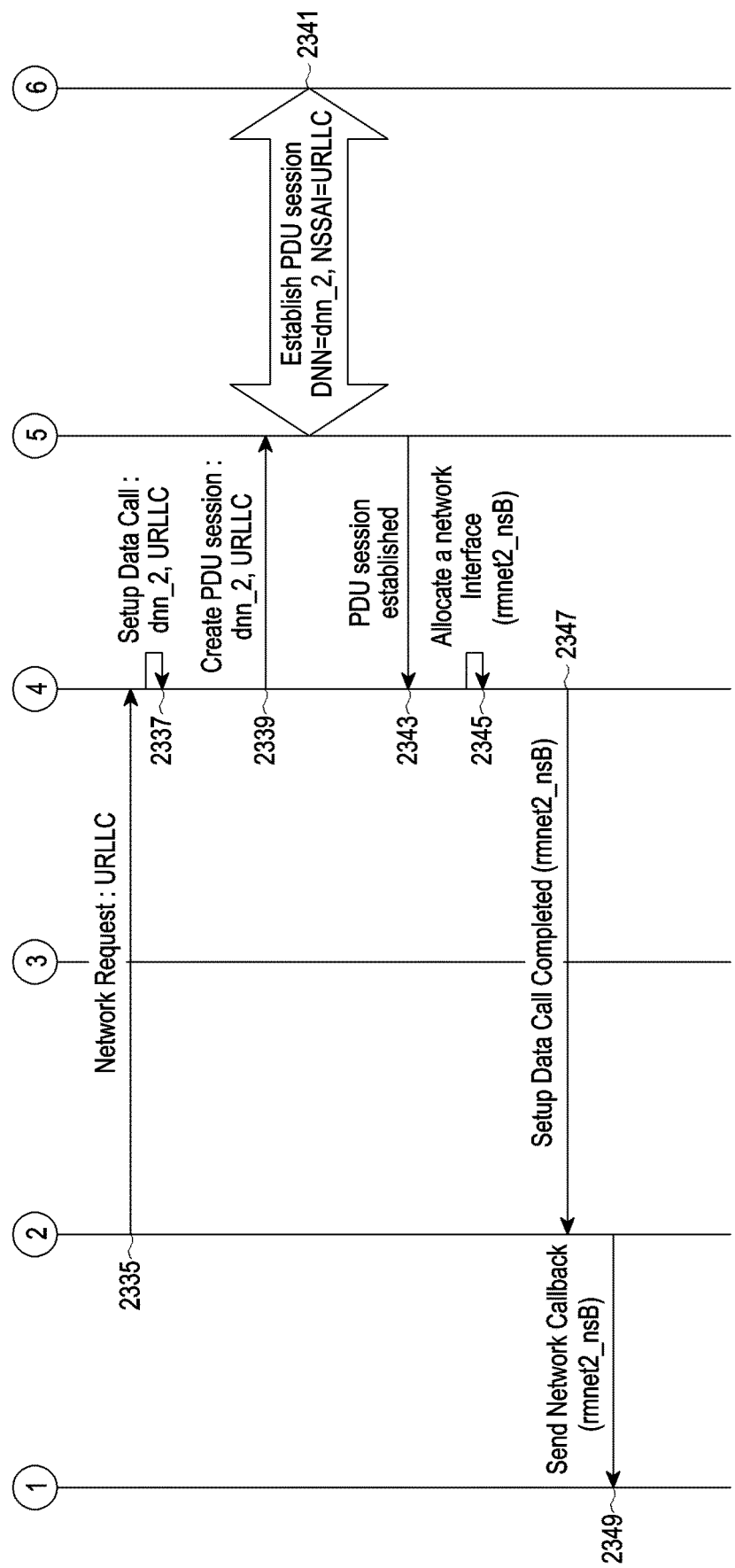

FIGS. 23A and 23B is a signal flow diagram illustrating an example method of operating an electronic device according to various embodiments. Operation 2311, operation 2313, operation 2315, and operation 2319 may be substantially the same as or similar operation 2211, operation 2213, operation 2215, and operation 2219 in FIGS. 22A and 22B, and a detailed description thereof may not be repeated. A URSP rule 2317 may be substantially the same as or similar to the URSP rule 2217 in FIG. 22A, and a detailed description thereof may not be repeated.

According to various embodiments, in operation 2321, the application 2201 may transfer a network request (e.g., a PDU session establishment request) to ConnectivityManagerService 2202. The application 2201 may transfer the network request without specifying a network slice. Operation 2323, operation 2325, operation 2327, and operation 2329 may be substantially the same as operation 2231, operation 2233, operation 2235, and operation 2237 in FIG. 22A, and a detailed description may not be repeated. Where the application 2201 does not specify a network slice, ConnectivityManagerService 2202 may, in operation 2331, request acquisition of information (e.g., NSSAI) on a network slice allowed to the application 2201 from UrspService 2203. In operation 2333, UrspService 2203 may return information indicating URLLC that is a network slice corresponding to the application 2201 (e.g., the second application), based on the stored URSP rule 2317. ConnectivityManagerService 2202 may, in operation 2335, transfer a network request (e.g., PDU session establishment request) to TelephonyService 2204. The network request may include information (e.g., URLLC) on a network slice. Operation 2337, operation 2339, operation 2341, operation 2343, operation 2345, operation 2347, and operation 2349 may be substantially the same as operation 2241, operation 2243, operation 2245, operation 2247, operation 2249, operation 2251, and operation 2253 in FIG. 22, and a detailed description will be omitted.

Figure 24:
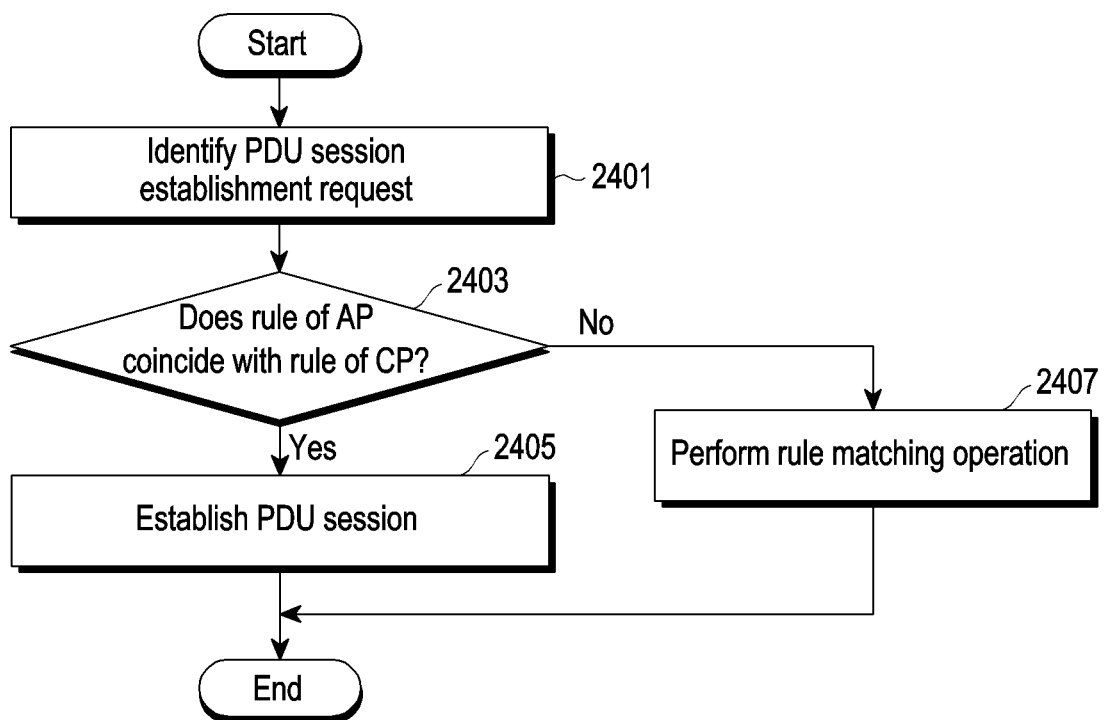
FIG. 24 is a flowchart illustrating an example method of operating an electronic device according to various embodiments.

FIG. 24 is a flowchart for illustrating an example method of operating an electronic device according to various embodiments.

According to various embodiments, the electronic device 101 may, in operation 2401, identify a PDU session establishment request. For example, the application processor 510 of the electronic device 101 may identify a PDU session establishment request from a stored (or accessible) application. The electronic device 101 may, in operation 2403, identify whether a rule of the application processor 510 coincides with a rule of the communication processor 520. Identification of whether the rules matches with each other may be performed by the application processor 510, the communication processor 520, or both of the processors. Where the rule of the application processor 510 coincides with the rule of the communication processor 520 (operation 2430-yes), the electronic device 101 may, in operation 2405, establish a PDU session. Where the rule of the application processor 510 does not coincide with the rule of the communication processor 520 (operation 2430-no), the electronic device 101 may, in operation 2407, perform a rule matching operation. For example, the electronic device 101 may transfer the rule of the application processor 510 to the communication processor 520 again, so as to allow the rules of both of the processes to match with each other, but the reverse process thereof is also possible. After performing the rule matching operation, the electronic device 101 may perform PDU session establishment again.

Figure 25A:
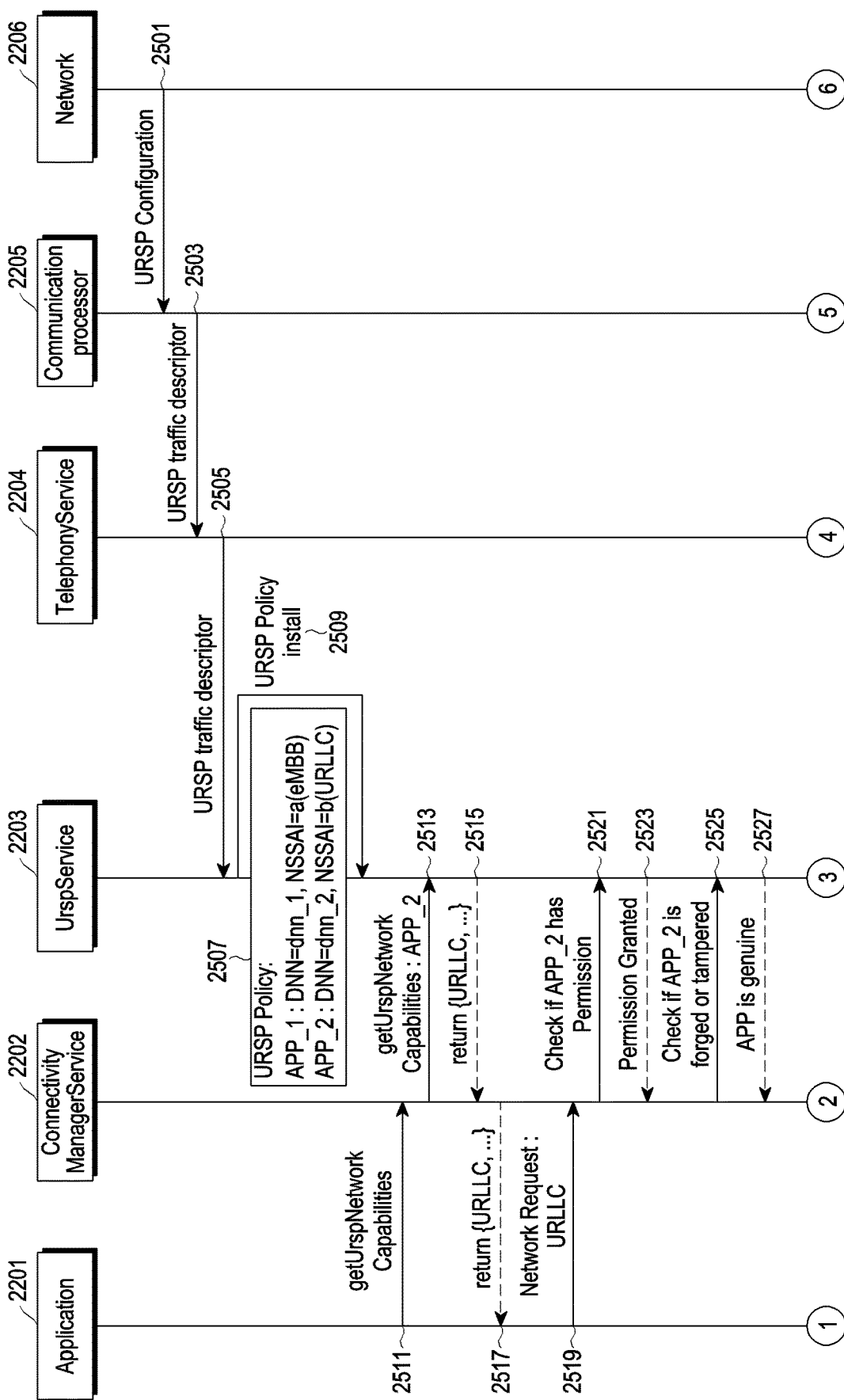
FIGS. 25A and 25B is a signal flow diagram illustrating an example method of operating an electronic device according to various embodiments.
Figure 25B:
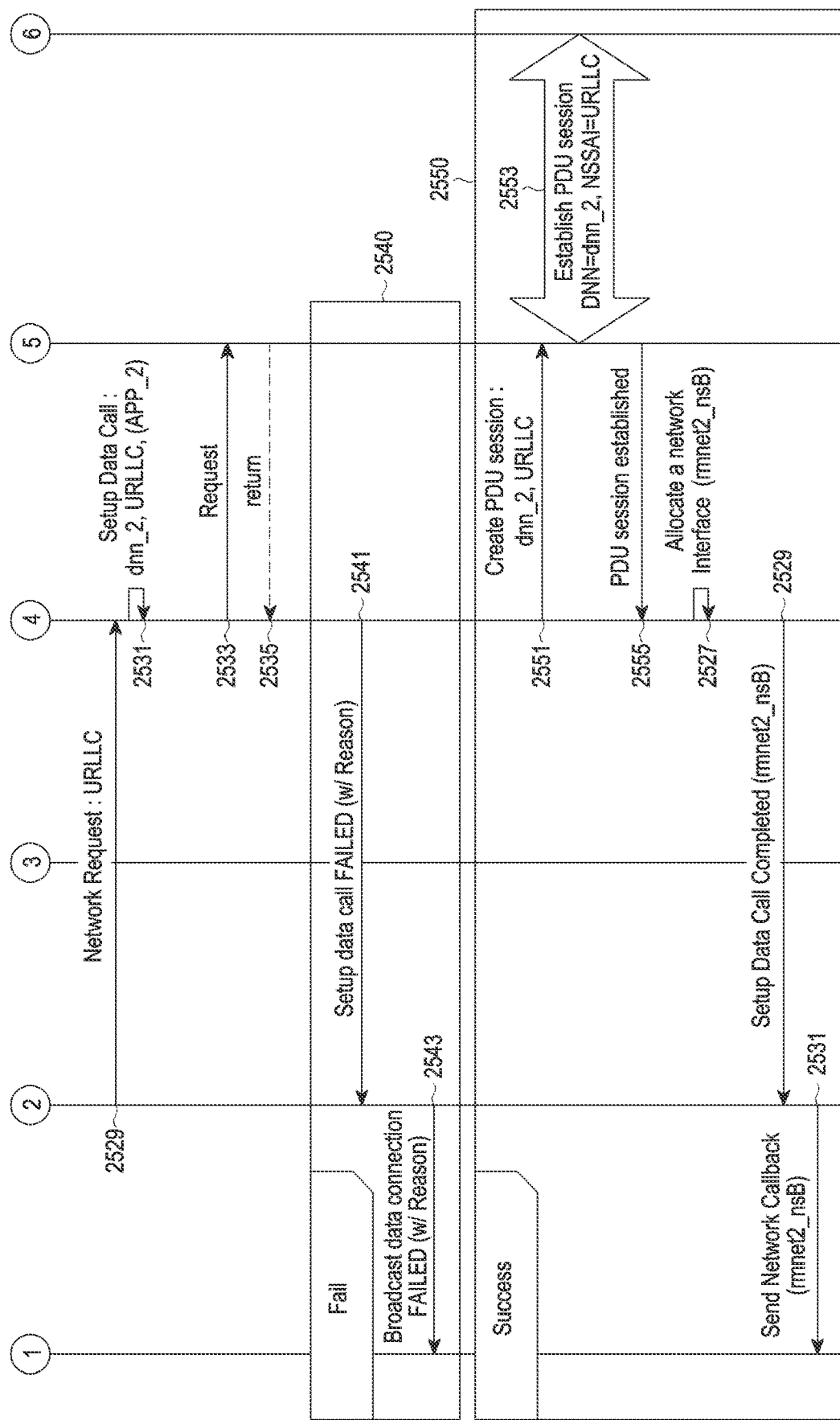

FIGS. 25A and 25B is a signal flow diagram illustrating an example method of operating an electronic device according to various embodiments. Operation 2501, operation 2503, operation 2505, operation 2509, operation 2511, operation 2513, operation 2515, operation 2517, operation 2519, operation 2521, operation 2523, operation 2525, operation 2527, operation 2529, and operation 2531 may be substantially the same as operation 2211, operation 2213, operation 2215, operation 2219, operation 2221, operation 2223, operation 2225, operation 2227, operation 2229, operation 2231, operation 2233, operation 2235, operation 2237, operation 2238, and operation 2241 in FIGS. 22A and 22B, and a detailed description thereof may not be repeated. A URSP rule 2507 may be substantially the same as the URSP rule 2217 in FIG. 22A, and a detailed description thereof may not be repeated.

According to various embodiments, an application processor, for example, TelephonyService 2204 may, in operation 2533, provide a request to the communication processor 2205. In one example, the request in operation 2533 may be a request for at least some of URSP rules being managed by the communication processor 2205. The request may include at least one of, for example, information of the application 2201, DNN information (e.g., an identification number), a DNN type (e.g., an Internet DNN), or a service type (e.g., URLLC) of a network slice. The communication processor 2205 may, in operation 2535, return, to TelephonyService 2204, at least some of URSP rules associated with the application 2201, for example, at least one of DNN information (e.g., an identification number), a DNN type (e.g., an Internet DNN), or a service type (e.g., URLLC) of a network slice, which corresponds to the application 2201, in response to the request of operation 2533. The application processor, for example, TelephonyService 2204 may compare at least some of URSP rules received from the communication processor 2205, with a stored URSP rule 2509, and identify whether the rules match with each other. In another example, the request in operation 2533 may be a request allowing the communication processor 2205 to identify whether rules match each other. The request may include at least one of, for example, information of the application 2201, DNN information (e.g., an identification number), a DNN type (e.g., an Internet DNN), or a service type (e.g., URLLC) of a network slice. The communication processor 2205 may compare at least some of URSP rules included in the received request with a URSP rule being managed by the communication processor 2205, and identify whether the rules match with each other. The communication processor 2205 may, in operation 2535, return information (e.g., true or false) indicating match/mismatch to TelephoneyService 2204. The application processor may, in operation 2535, identify whether rules managed by the processors match with each other, based on the information indicating match/mismatch.

As in the two above examples, at least one of the application processor, for example, or TelephonyService 2204 or the communication processor 2205 may identify whether rules match with each other, and TelephonyService 2204 may identify match/mismatch. In operation 2540, a case where matching is identified as failure according to a result of comparison is illustrated. TelephonyService 2204 may, in operation 2541, provide information indicating failure of setup of a data call to ConnectivityManagerService 2202. The corresponding information may include a reason (e.g., rule mismatch) of the failure. ConnectivityManagerService 2202 may, in operation 2543, provide the information indicating failure of setup of the data call to the application 2201. The application processor may stop establishing of a PDU session. The application processor may not stop establishing of a PDU session, and request the communication processor 2205 to establish a PDU session. The network 2206 may reject a PDU session establishment request. At least one of the application processor or the communication processor 2205 may perform an operation of matching rules. In operation 2550, a case where matching is identified as success according to a result of comparison is illustrated. Operation 2551, operation 2553, operation 2555, operation 2557, operation 2559, and operation 2561 may be substantially the same as operation 2243, operation 2245, operation 2247, operation 2249, operation 2251, and operation 2253 in FIG. 22B, and a detailed description may not be repeated.

Figure 26:
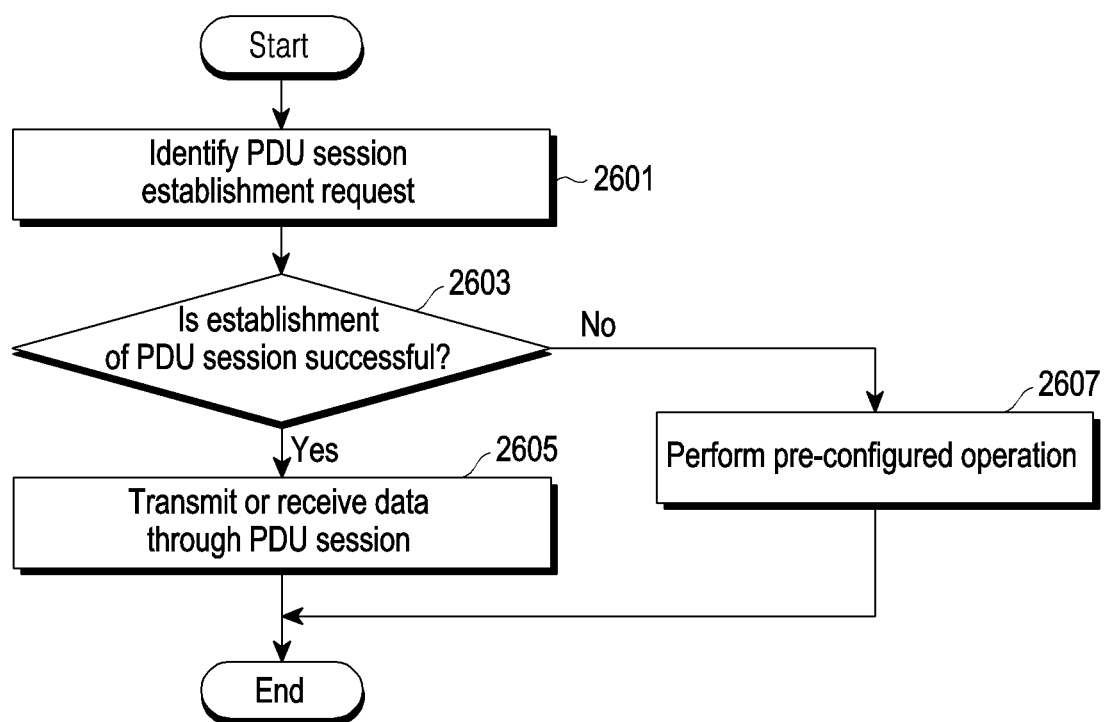
FIG. 26 is a flowchart illustrating an example method of operating an electronic device according to various embodiments.

FIG. 26 is a flowchart illustrating an example method of operating an electronic device according to various embodiments.

According to various embodiments, the electronic device 101 may, in operation 2601, identify a PDU session establishment request. For example, the application processor 510 of the electronic device 101 may identify a PDU session establishment request from a stored (or accessible) application. The electronic device 101 may, in operation 2603, attempt to establish a PDU session, and identify whether the establishment of the PDU session is successful. When the establishment of the PDU session is successful (operation 2603-yes), the electronic device 101 may, in operation 2605, transmit and/or receive data through the PDU session. When the establishment of the PDU session fails (operation 2603-no), the electronic device 101 may, in operation 2607, perform a pre-configured operation. The pre-configured operation may be, for example, an operation for matching at least some of URSP rules received from a network (e.g., a PCF) to at least some of URSP rules being managed by the electronic device 101 (e.g., the application processor and/or the communication processor).

Figure 27A:
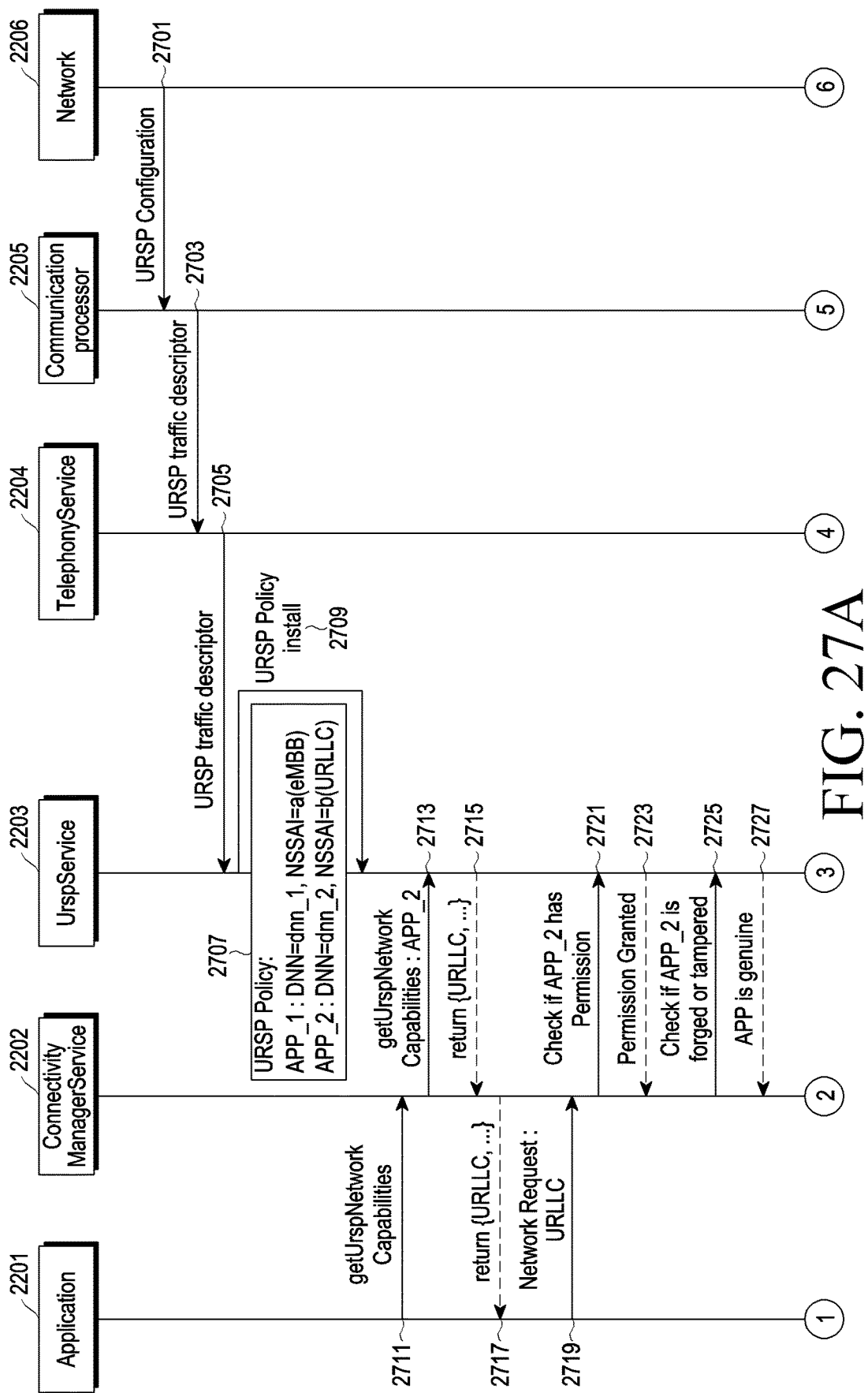
FIGS. 27A and 27B is a signal flow diagram illustrating an example method of operating an electronic device according to various embodiments.
Figure 27B:
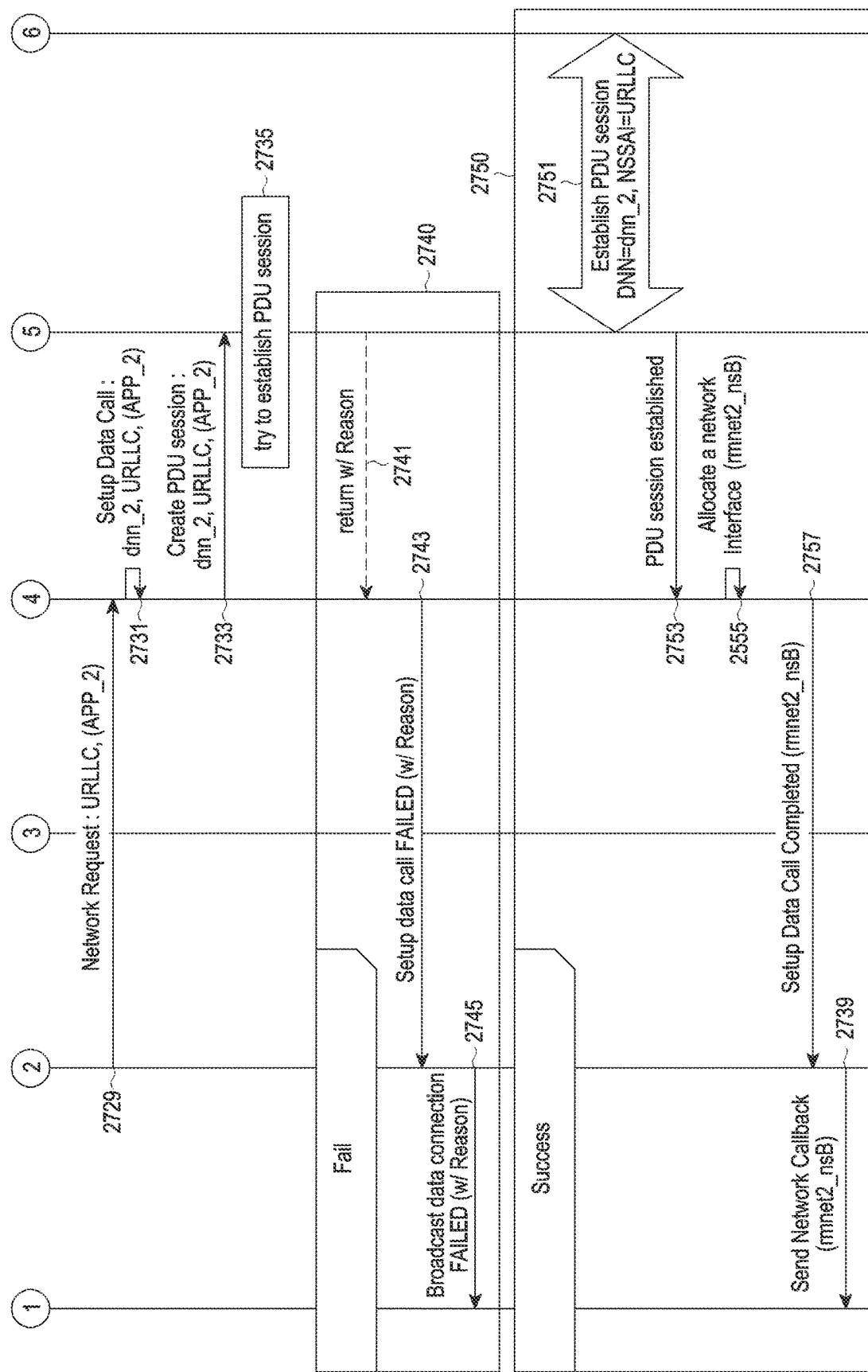

FIGS. 27A and 27B is a signal flow diagram illustrating an example method of operating an electronic device according to various embodiments. Operation 2701, operation 2703, operation 2705, operation 2709, operation 2711, operation 2713, operation 2715, operation 2717, operation 2719, operation 2721, operation 2723, operation 2725, operation 2727, operation 2729, operation 2731, and operation 2733 may be substantially the same as operation 2211, operation 2213, operation 2215, operation 2219, operation 2221, operation 2223, operation 2225, operation 2227, operation 2229, operation 2231, operation 2233, operation 2235, operation 2237, operation 2238, operation 2241, and operation 2243 in FIG. 22, and a detailed description therefor will be omitted. A URSP rule 2707 may be substantially the same as the URSP rule 2217 in FIGS. 22A and 22B, and a detailed description thereof may not be repeated.

According to various embodiments, the communication processor 2205 may, in operation 2535, attempt to establish a PDU session, based on a PDU session establishment request received in operation 2733. In operation 2740, a case where the establishment of the PDU session fails is illustrated. For example, the communication processor 2205 may identify failure of the establishment of the PDU session, and may, in operation 2741, provide information indicating the failure to TelephonyService 2204. The corresponding information may include a reason of the failure.

TelephonyService 2204 may, in operation 2743, provide information indicating failure of setup of a data call to ConnectivityManagerService 2202. The corresponding information may include a reason of the failure. ConnectivityManagerService 2202 may, in operation 2745, provide the information indicating failure of setup of the data call to the application 2201. At least one of the application processor or the communication processor 2205 may perform an operation of matching a rule of the network 2206 to a rule managed by the electronic device 101. In operation 2750, a case where matching is identified as success according to a result of comparison is illustrated. Operation 2751, operation 2753, operation 2755, operation 2757, and operation 2759 may be substantially the same as operation 2245, operation 2247, operation 2249, operation 2251, and operation 2253 in FIG. 22B, and a detailed description may not be repeated.

According to various example embodiments, an electronic device may include: at least one processor, wherein the at least one processor is configured to: identify a data session establishment request from a first application executed by the at least one processor, identify at least one first descriptor for route selection corresponding to the first application, identify a first network interface corresponding to the identified at least one first descriptor based on the identified at least one first descriptor, establish a first data session corresponding to the identified at least one first descriptor, and transmit and/or receive data associated with the first application via the first network interface by using the first data session.

According to various example embodiments, the at least one first descriptor may include at least one of a DNN corresponding to the first application or NSSAI corresponding to the first application.

According to various example embodiments, the at least one processor may be configured to, as at least a part of an operation of identifying the at least one first descriptor corresponding to the first application: identify multiple descriptors corresponding to the first application, and select the at least one first descriptor among the multiple descriptors.

According to various example embodiments, the at least one processor may be further configured to: identify an initialization event of the first network interface, and identify association information between the first network interface and the at least one first descriptor based on the initialization event.

According to various example embodiments, the at least one processor may be configured to, as at least a part of an operation of transmitting or receiving the data associated with the first application via the first network interface using the first data session: transmit a first IP packet transmitted via the first network interface using the first data session based on the association information between the first network interface and the at least one first descriptor, and provide a second IP packet received using the first data session to the first application via the first network interface based on the association information between the first network interface and the at least one first descriptor.

According to various example embodiments, the at least one processor may include an application processor and a communication processor, the application processor may be configured to: identify association information between the first network interface and the at least one first descriptor based on the initialization event, and provide the association information between the first network interface and the at least one first descriptor to the communication processor, and the communication processor may be configured to: receive the association information between the first network interface and the at least one first descriptor from the application processor, transmit a first IP packet output via the first network interface using the first data session corresponding to the first descriptor based on the association information between the first network interface and the at least one first descriptor, and transmit a second IP packet received using the first data session to the application processor via the first network interface based on the association information between the first network interface and the at least one first descriptor.

According to various example embodiments, the communication processor may be configured to, based on reception of the at least one first descriptor from the application: establish the first data session corresponding to the first descriptor.

According to various example embodiments, the at least one processor may be configured to, as at least a part of an operation of identifying the at least one first descriptor corresponding to the first application: identify the at least one first descriptor based on identification of whether the first application is able to use the first descriptor.

According to various example embodiments, the at least one processor may be configured to, as at least a part of an operation of identifying the at least one first descriptor, based on identification of whether the first application is able to use the first descriptor: identify whether the first application is able to use the first descriptor based on at least one of whether the first application is a normal application, or whether the first application has an authority to use the first data session corresponding to the first descriptor.

According to various example embodiments, the at least one processor may be further configured to: based on acquisition of, from a second application, a data session request specifying use of the first descriptor, disapprove of the second application using the first descriptor based on identification that the second application is unable to use the first descriptor.

According to various example embodiments, the at least one processor may be configured to: identify that the first application is able to use at least one second descriptor different from the at least one first descriptor, identify a second network interface corresponding to the at least one second descriptor based on the at least one second descriptor, establish a second data session corresponding to the at least one second descriptor, and transmit and/or receive different data associated with the first application via the second network interface using the second data session.

According to various example embodiments, an electronic device may include: at least one application processor, and at least one communication processor, wherein the at least one application processor is configured to: acquire first transmission data from a first application executed by the at least one application processor, and provide information associated with the first application and the first transmission data to the at least one communication processor, and the at least one communication processor is configured to: identify at least one first descriptor for route selection corresponding to the first application based on the information associated with the first application, and transmit the first transmission data using a first data session corresponding to the first descriptor.

According to various example embodiments, the at least one application processor may be configured to, as at least a part of an operation of providing the information associated with the first application and the first transmission data to the at least one communication processor: provide, as the information associated with the first application, the at least one first descriptor corresponding to the first application to the at least one communication processor, and the at least one communication processor may be configured to, as at least a part of an operation of identifying the at least one first descriptor based on the information associated with the first application: identify the first descriptor received from the at least one application processor.

According to various example embodiments, the at least one application processor may be further configured to: share association information between identification information of the first application and the at least one first descriptor with the at least one communication processor.

According to various example embodiments, the at least one application processor may be configured to, as at least a part of an operation of providing the information associated with the first application and the first transmission data to the at least one communication processor: provide the identification information of the first application as the information associated with the first application to the at least one communication processor, and the at least one communication processor may be configured to, as at least a part of an operation of identifying the at least one first descriptor: identify the at least one first descriptor, based on the identification information of the first application and the shared association information.

According to various example embodiments, the at least one application processor may be further configured to: share association information between identification information of a first rule applied to the first application and the at least one first descriptor with the at least one communication processor.

According to various example embodiments, the at least one application processor may be configured to, as at least a part of an operation of providing the information associated with the first application and the first transmission data to the at least one communication processor: provide the identification information of the first rule as the information associated with the first application to the at least one communication processor, and the at least one communication processor may be configured to, as at least a part of an operation of identifying the at least one first descriptor:

identify the at least one first descriptor based on the identification information of the first rule and the shared association information.

According to various example embodiments, a method of operating a communication processor may include: receiving association information between one or more network interfaces and corresponding descriptors from an application processor operatively connected to the communication processor, establishing, based on reception of at least one first descriptor corresponding to a first network interface among the one or more network interfaces from the application processor, a first data session corresponding to the at least one first descriptor based on the association information, and based on reception of a first IP packet via the first network interface, transmitting the received first IP packet using the first data session.

According to various example embodiments, the method may further include: transmitting, based on reception of a second IP packet using the first data session, the received second IP packet to the application processor via the first network interface based on the association information.

According to various example embodiments, the at least one first descriptor may include at least one of a DNN or NSSAI.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
memory storing instructions; and
at least one processor operatively connected to the memory, wherein the at least one processor includes an application processor and a communication processor,
wherein the instructions, when executed by the application processor, cause the electronic device to:
identify an initialization event of a first network interface, and identify association information between the first network interface and at least one first descriptor based on the initialization event, wherein the first network interface includes an interface for transmitting or receiving data associated with a first application between the application processor and the communication processor, wherein the initialization event includes at least one of installation of the first application, removal of the first application, activation of the first application, deactivation of the first application, or a user input,
store a first rule comprising association information between information associated with at least one application and at least one descriptor corresponding to the information associated with the at least one application, based on obtaining the first rule from the at least one application, wherein the at least one application includes the first application,
identify a data session establishment request from the first application executed by the application processor,
identify the at least one first descriptor for route selection corresponding to the first application, based on information associated with the first application and the first rule,
assign the first network interface corresponding to the identified at least one first descriptor of the first application,
provide information associated with the at least one first descriptor to the communication processor,
wherein the instructions, when executed by the communication processor, cause the electronic device to:
establish, based on the at least one first descriptor provided by the application processor, a first data session corresponding to the at least one first descriptor, and identify that the first data session is associated with the first network interface, and
transmit or receive data associated with the first application via the first network interface using the first data session.

2. The electronic device of claim 1, wherein the at least one first descriptor comprises at least one of a data network name (DNN) corresponding to the first application or network slice selection assistance information (NSSAI) corresponding to the first application.

3. The electronic device of claim 1, wherein the instructions, when executed by the application processor, cause the electronic device to, as at least a part of identifying the at least one first descriptor for route selection corresponding to the first application, based on information associated with the first application and the first rule: identify multiple descriptors corresponding to the first application, and select the at least one first descriptor among the multiple descriptors.

4. The electronic device of claim 1, wherein
the instructions, when executed by the application processor, cause the electronic device to:
identify association information between the first network interface and the at least one first descriptor based on the initialization event, and
provide the association information between the first network interface and the at least one first descriptor to the communication processor, and
wherein the instructions, when executed by the communication processor, cause the electronic device to:
receive the association information between the first network interface and the at least one first descriptor from the application processor,
transmit a first IP packet output via the first network interface using the first data session corresponding to the first descriptor based on the association information between the first network interface and the at least one first descriptor, and
transmit a second IP packet received using the first data session to the application processor via the first network interface based on the association information between the first network interface and the at least one first descriptor.

5. The electronic device of claim 1, wherein the instructions, when executed by the application processor, cause the electronic device to, as at least a part of identifying the at least one first descriptor corresponding to the first application, based on the information associated with the first application and the first rule:
identify the at least one first descriptor for route selection based on identifying whether the first application is allowed to use the first descriptor.

6. The electronic device of claim 5, wherein the instructions, when executed by the application processor, cause the electronic device to, as at least a part of identifying the at least one first descriptor for route selection, based on identifying whether the first application is allowed to use the first descriptor:
identify whether the first application is allowed to use the first descriptor based on at least one of whether the first application is a normal application, whether the first application has an authority to use the first data session corresponding to the first descriptor.

7. The electronic device of claim 1, wherein the instructions, when executed by the application processor, cause the electronic device to,
based on acquisition of, from a second application, a data session request specifying use of the first descriptor:
disapprove of the second application using the first descriptor based on identifying that the second application is not allowed to use the first descriptor.

8. The electronic device of claim 1, wherein the instructions, when executed by the application processor, cause the electronic device to:
identify that the first application is allowed to use at least one second descriptor different from the at least one first descriptor,
identify a second network interface corresponding to the at least one second descriptor based on the at least one second descriptor,
establish a second data session corresponding to the at least one second descriptor, and
transmit or receive different data associated with the first application via the second network interface using the second data session.

9. An electronic device comprising:
memory storing instructions;
at least one application processor; and
at least one communication processor, wherein the instructions, when executed by the at least one application processor, cause the electronic device to:
identify an initialization event of a first network interface, and identify association information between the first network interface and at least one first descriptor based on the initialization event, wherein the first network interface includes an interface for transmitting or receiving data associated with a first application between the at least one application processor and the at least one communication processor, wherein the initialization event includes at least one of installation of the first application, removal of the first application, activation of the first application, deactivation of the first application, or a user input,
store a first rule comprising association information between information associated with at least one application and at least one descriptor corresponding to the information associated with the at least one application, based on obtaining the first rule from the at least one application, wherein the at least one application includes the first application,
share association information between information associated with the at least one application and the at least one descriptor for route selection corresponding to the at least one application with the at least one communication processor,
acquire first transmission data from the first application among the at least one application executed by the at least one application processor, and
provide information associated with the first application and the first transmission data to the at least one communication processor, and
wherein the instructions, when executed by the at least one communication processor, cause the electronic device to:
identify the at least one first descriptor for route selection corresponding to the first application based on the information associated with the first application, and
transmit the first transmission data using a first data session corresponding to the first descriptor.

10. The electronic device of claim 9, wherein the instructions, when executed by the at least one application processor, cause the electronic device to, as at least a part of providing the information associated with the first application and the first transmission data to the at least one communication processor: provide, as the information associated with the first application, the at least one first descriptor corresponding to the first application to the at least one communication processor, and
wherein the instructions, when executed by the at least one communication processor, cause the electronic device to, as at least a part of identifying the at least one first descriptor: based on the information associated with the first application, identify the first descriptor received from the at least one application processor.

11. The electronic device of claim 9, wherein the instructions, when executed by the at least one application processor, cause the electronic device to, as at least part of the sharing association information between the information associated with at least one application and the at least one descriptor for route selection corresponding to the at least one application with the at least one communication processor:
share association information between identification information of the first application and the at least one first descriptor with the at least one communication processor.

12. The electronic device of claim 11, wherein the instructions, when executed by the at least one application processor, cause the electronic device to:
as at least a part of providing the information associated with the first application and the first transmission data to the at least one communication processor: provide the identification information of the first application as the information associated with the first application to the at least one communication processor, and
wherein the instructions, when executed by the at least one communication processor, cause the electronic device to, as at least a part of identifying the at least one first descriptor: identify the at least one first descriptor based on the identification information of the first application and the shared association information.

13. The electronic device of claim 9, wherein the instructions, when executed by the at least one application processor, cause the electronic device to, as at least part of the sharing association information between the information associated with at least one application and the at least one descriptor for route selection corresponding to the at least one application with the at least one communication processor:
share association information between identification information of a first rule applied to the first application and the at least one first descriptor with the at least one communication processor.

14. The electronic device of claim 13, wherein the instructions, when executed by the at least one application processor, cause the electronic device to: as at least a part of providing the information associated with the first application and the first transmission data to the at least one communication processor: provide the identification information of the first rule as the information associated with the first application to the at least one communication processor, and
wherein the instructions, when executed by the at least one communication processor, cause the electronic device to, as at least a part of identifying the at least one first descriptor: identify the at least one first descriptor based on the identification information of the first rule and the shared association information.

15. A method of operating an electronic device including an application processor and a communication processor operatively connected to the application processor, the method comprising:
identifying, by the application processor, an initialization event of a first network interface, and identify association information between the first network interface and at least one first descriptor based on the initialization event, wherein the first network interface includes an interface for transmitting or receiving data associated with a first application between the application processor and the communication processor, wherein the initialization event includes at least one of installation of the first application, removal of the first application, activation of the first application, deactivation of the first application, or a user input,
storing, by the application processor, a first rule comprising association information between information associated with at least one application and at least one descriptor corresponding to the information associated with the at least one application, based on obtaining the first rule from the at least one application, wherein the at least one application includes the first application, sharing, by the application processor, association information between one or more network interfaces and corresponding descriptors with the communication processor;

receiving, by the communication processor, the at least one first descriptor corresponding to the first network interface among the one or more network interfaces from the application processor;

based on reception of the at least one first descriptor, establishing, by the communication processor, a first data session corresponding to the at least one first descriptor based on the association information; and based on reception of a first IP packet via the first network interface, transmitting, by the communication processor, the received first IP packet using the first data session.

16. The method of claim 15, wherein the method further comprising:

transmitting, by the communication processor, a second IP packet to the application processor via the first network interface, based on the association information, based on the second IP packet is received using the first data session.

17. The method of claim 15, wherein the at least one first descriptor comprises at least one of a data network name (DNN) or network slice selection assistance information (NSSAI).

* * * * *